(12) United States Patent
McKibbin

(10) Patent No.: US 10,960,617 B2
(45) Date of Patent: Mar. 30, 2021

(54) APPARATUS AND METHODS FOR MANUFACTURING AND REPAIRING FIBRE-REINFORCED COMPOSITE MATERIALS

(71) Applicant: SHORT BROTHERS PLC, Belfast (GB)

(72) Inventor: Andrew McKibbin, Millisle Down (GB)

(73) Assignee: SHORT BROTHERS PLC, Belfast (GB)

( * ) Notice: Subject to any disclaimer, the term of this patent is extended or adjusted under 35 U.S.C. 154(b) by 476 days.

(21) Appl. No.: 15/521,000

(22) PCT Filed: Oct. 22, 2015

(86) PCT No.: PCT/GB2015/053164
§ 371 (c)(1),
(2) Date: Apr. 21, 2017

(87) PCT Pub. No.: WO2016/063065
PCT Pub. Date: Apr. 28, 2016

(65) Prior Publication Data
US 2017/0341320 A1 Nov. 30, 2017

(30) Foreign Application Priority Data
Oct. 24, 2014 (GB) ...................... 1418921

(51) Int. Cl.
*B29C 73/02* (2006.01)
*B29C 73/10* (2006.01)
(Continued)

(52) U.S. Cl.
CPC .......... *B29C 73/025* (2013.01); *B29C 70/443* (2013.01); *B29C 73/02* (2013.01);
(Continued)

(58) Field of Classification Search
CPC ..... B29C 70/443; B29C 73/02; B29C 73/025; B29C 73/10
See application file for complete search history.

(56) References Cited

U.S. PATENT DOCUMENTS 6,206,067 B1 * 3/2001 Kociemba ........... B29C 43/3642
156/285
6,428,497 B1 8/2002 Crouch
(Continued)

FOREIGN PATENT DOCUMENTS

CN 1258247 A 6/2000
WO 2010058802 A1 4/2012
(Continued)

OTHER PUBLICATIONS

Chinese Office Action dated Sep. 4, 2018, for Chinese Application No. 201580057016.9.
(Continued)

*Primary Examiner* — Seyed Masoud Malekzadeh
(74) *Attorney, Agent, or Firm* — Hovey Williams LLP

(57) ABSTRACT

Apparatus and methods for manufacturing and repairing fibre-reinforced composite materials are disclosed. In various embodiments, the apparatus and methods disclosed herein use a resin retaining/releasing device comprising resin having a viscosity that is temperature dependent for infusion into a region of a part. The resin retaining/releasing device may include a first sheet and an opposite second sheet at least partially enclosing the quantity of resin. The first sheet and the second sheet may be gas-permeable. The second sheet may be substantially resin-impermeable when the viscosity of the resin is above a threshold viscosity and resin-permeable when the viscosity of the resin is below the threshold viscosity.

18 Claims, 21 Drawing Sheets

(51) Int. Cl.
*B29C 70/44* (2006.01)
*B29K 63/00* (2006.01)
*B29K 105/08* (2006.01)
*B29K 307/04* (2006.01)

(52) U.S. Cl.
CPC .......... *B29C 73/10* (2013.01); *B29K 2063/00* (2013.01); *B29K 2105/0872* (2013.01); *B29K 2307/04* (2013.01)

(56) References Cited

U.S. PATENT DOCUMENTS

| | | | |
|---|---|---|---|
| 6,818,159 B2 * | 11/2004 | Hinz | B29C 70/443 264/102 |
| 7,138,028 B2 | 11/2006 | Burpo et al. | |
| 7,939,011 B2 | 5/2011 | Young | |
| 2001/0008161 A1 | 7/2001 | Kociemba et al. | |
| 2003/0011094 A1 * | 1/2003 | Filsinger | B29C 70/086 264/102 |
| 2010/0124654 A1 | 5/2010 | Smith et al. | |
| 2011/0139344 A1 | 6/2011 | Watson et al. | |
| 2012/0305169 A1 | 12/2012 | Hanks et al. | |
| 2013/0264751 A1 | 10/2013 | Lockett et al. | |
| 2014/0131916 A1 | 5/2014 | Wadsworth et al. | |

FOREIGN PATENT DOCUMENTS

| | | |
|---|---|---|
| WO | 2012149939 A2 | 11/2012 |
| WO | 2014123646 A1 | 8/2014 |

OTHER PUBLICATIONS

International Search Report and Written Opinion dated Jan. 26, 2016, for International Patent Application No. PCT/GB2015/053164.

United Kingdom Search Report dated Apr. 22, 2015, for United Kingdom Patent Application No. GB1418921.1.

* cited by examiner

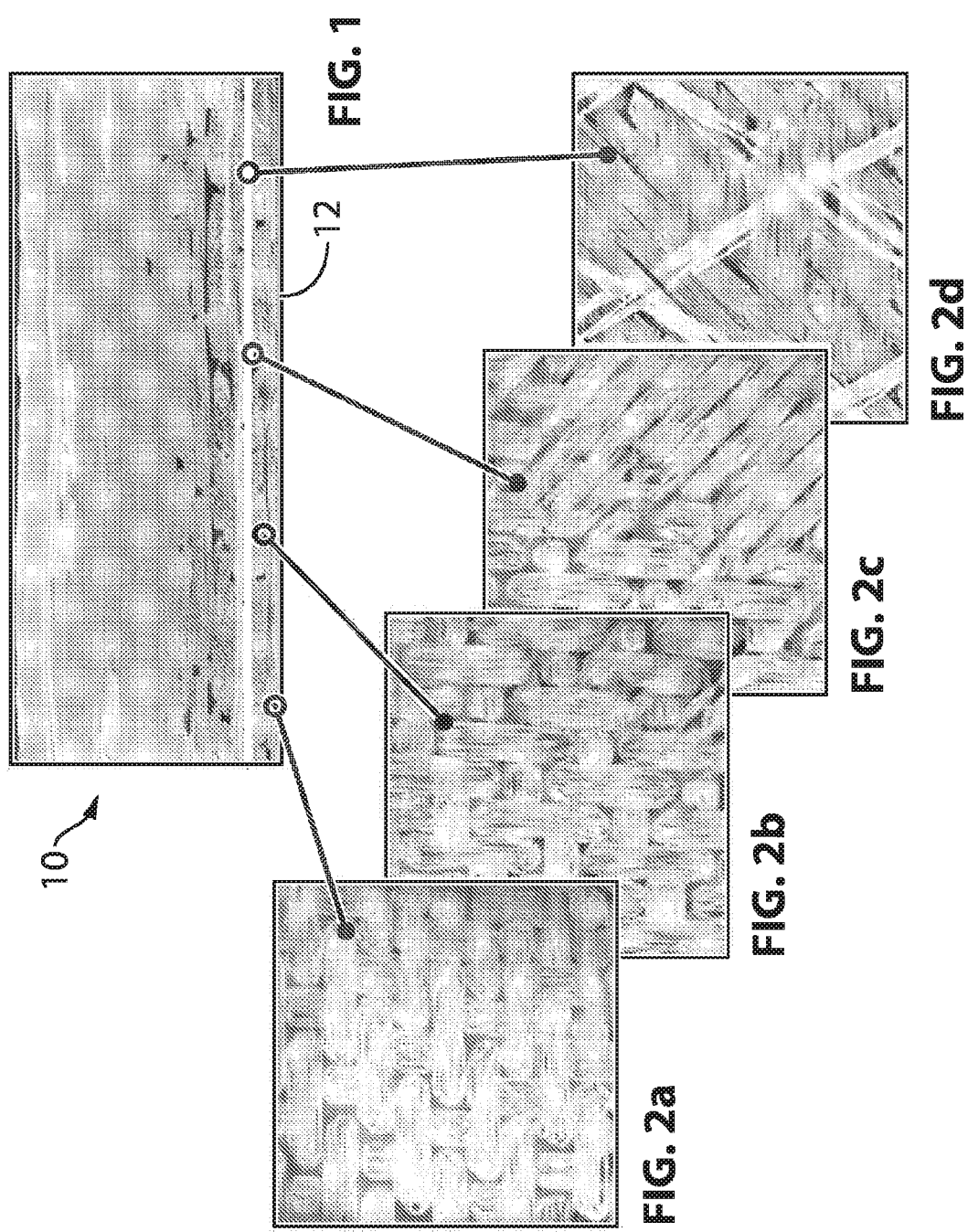

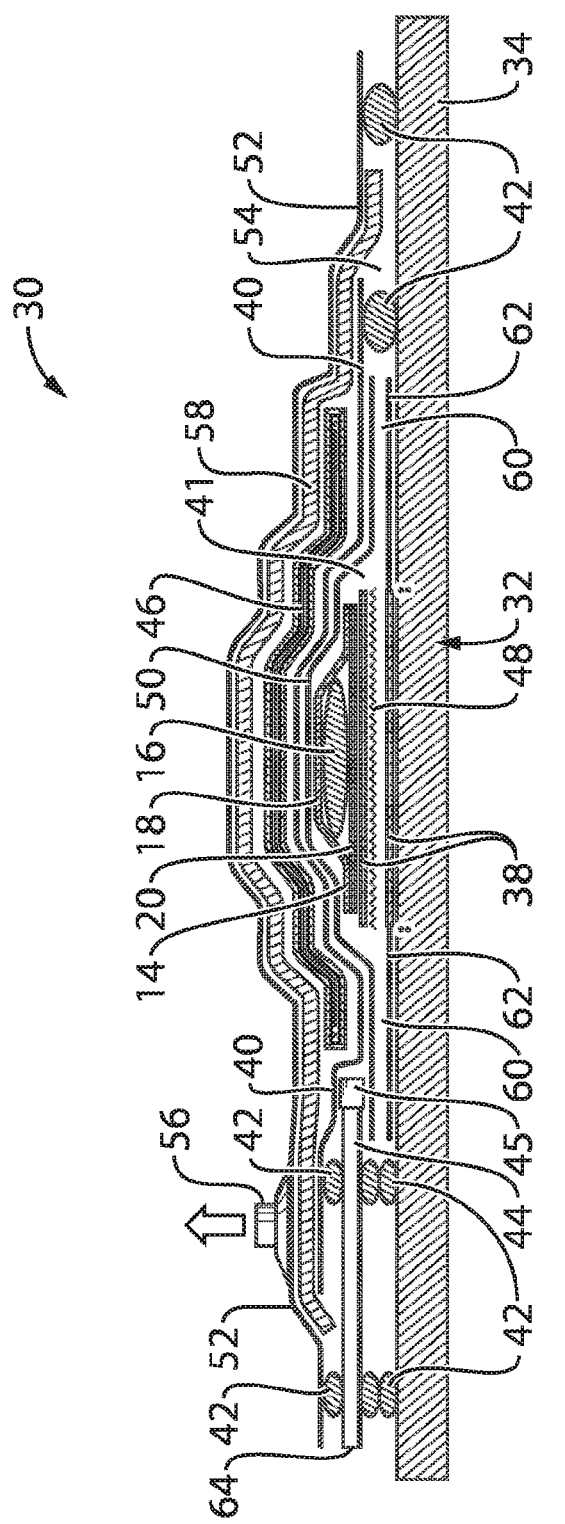
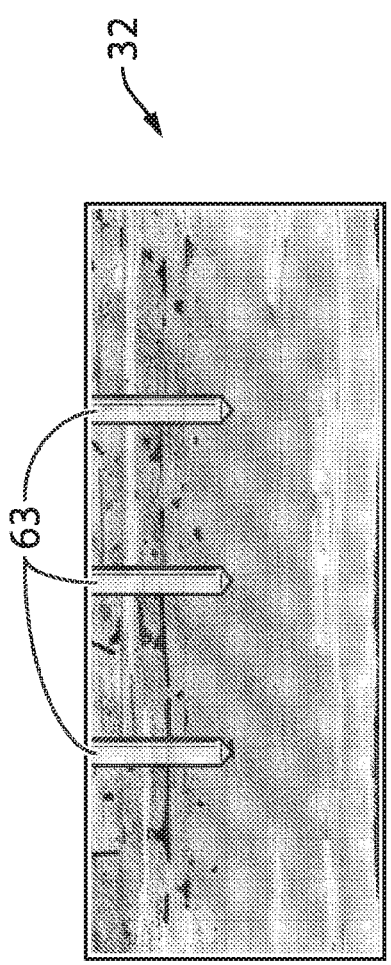
FIG. 8A
FIG. 8B

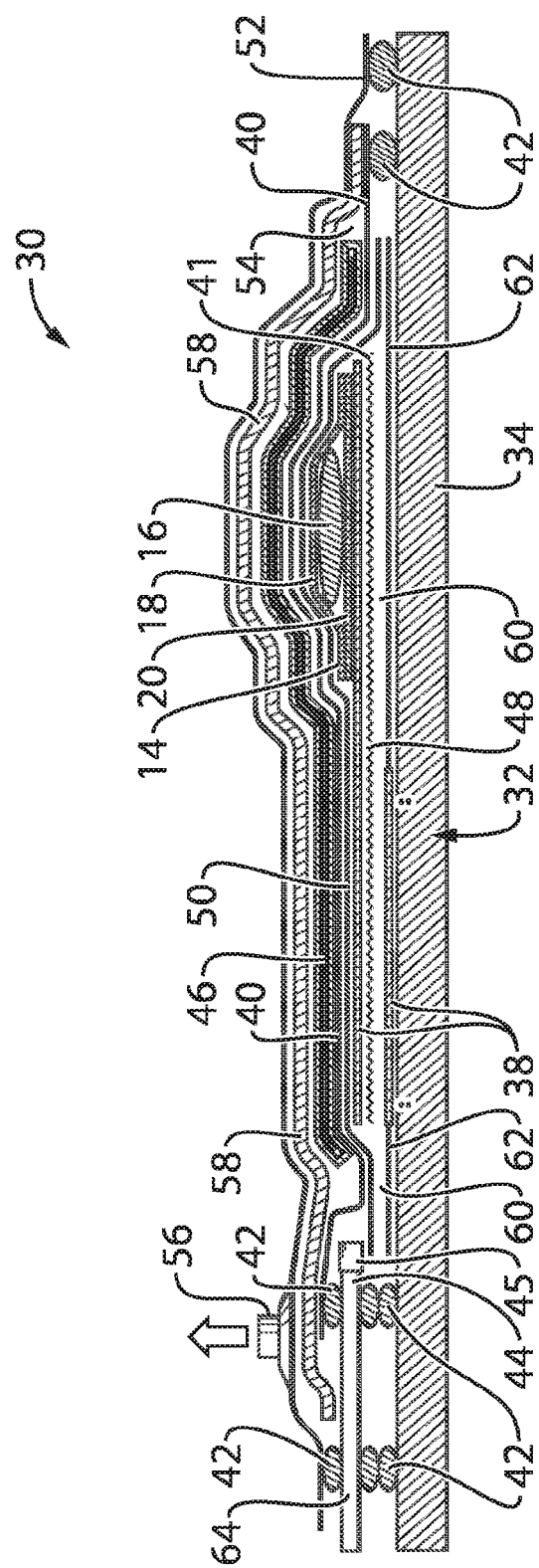

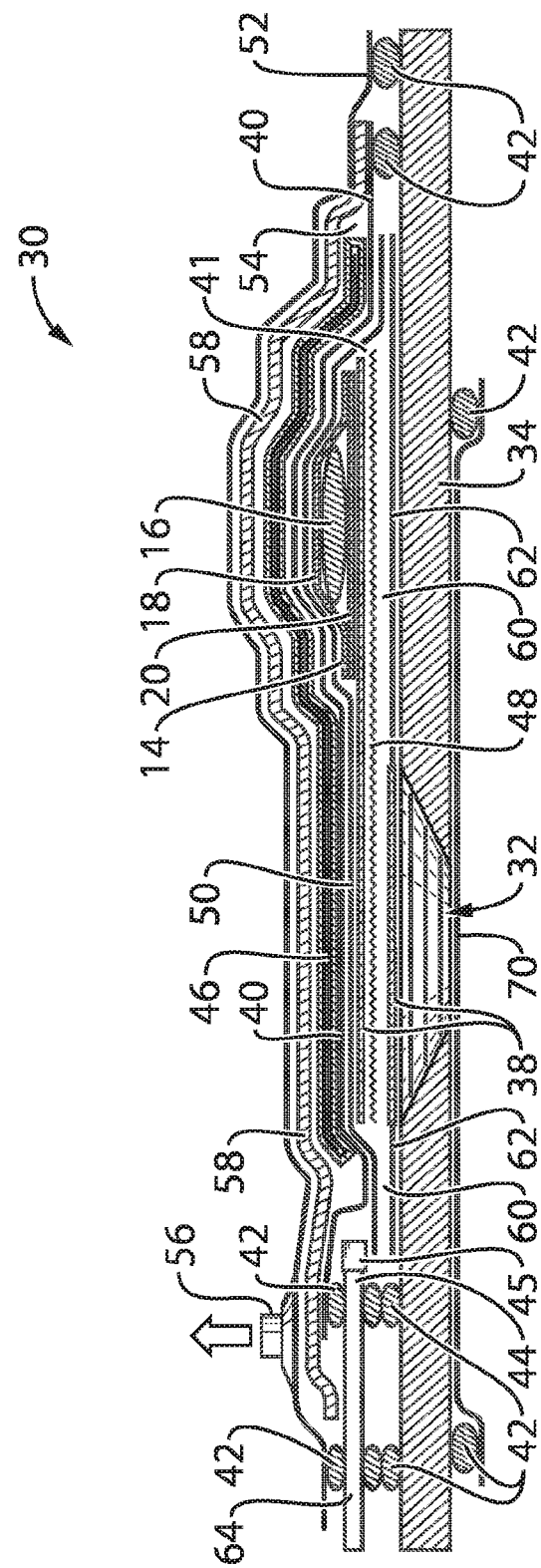

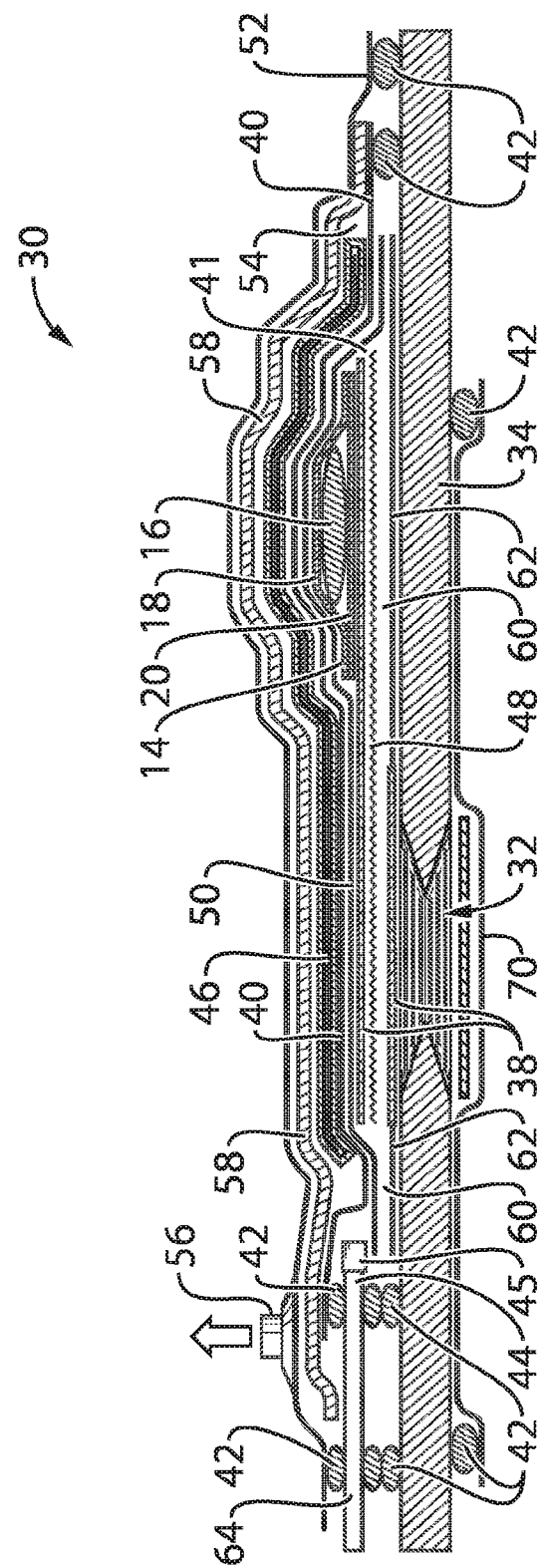

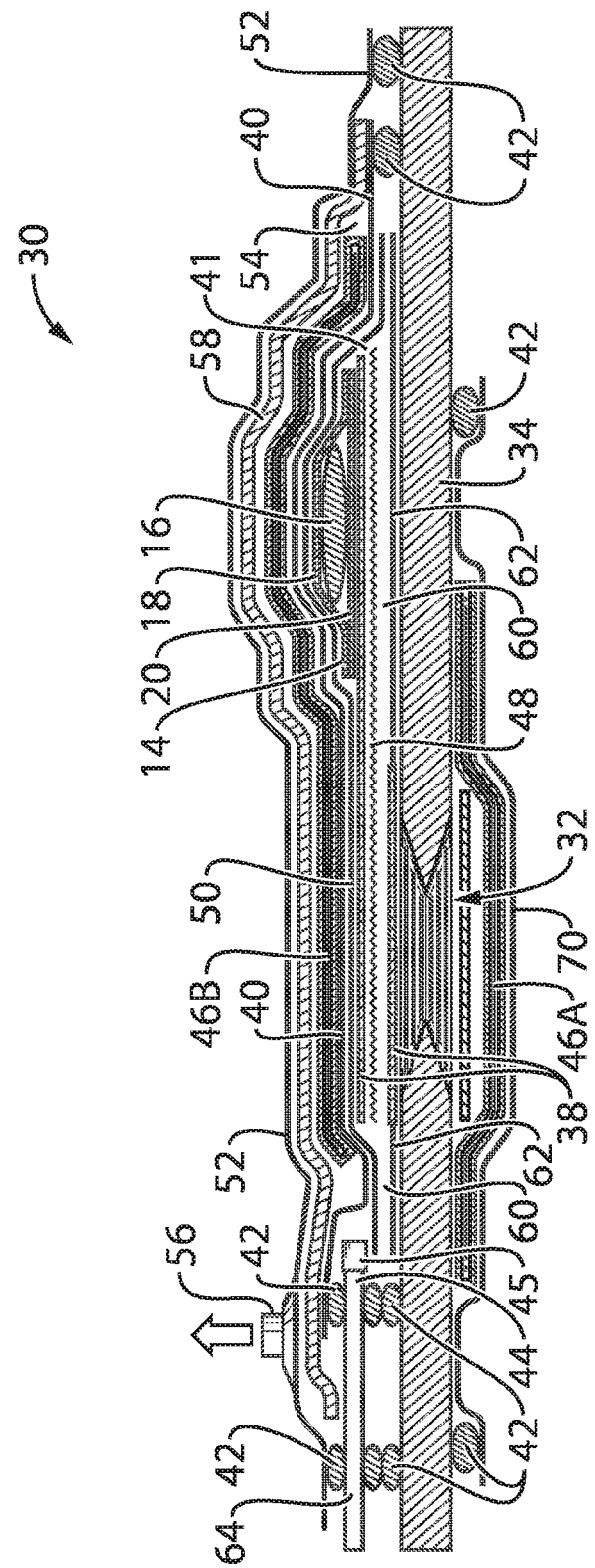

APPARATUS AND METHODS FOR MANUFACTURING AND REPAIRING FIBRE-REINFORCED COMPOSITE MATERIALS

CROSS REFERENCE TO RELATED PATENT APPLICATIONS

This is a National Stage Entry into the United States Patent and Trademark Office from International PCT Patent Application No. PCT/GB2015/053164, having an international filing date of Oct. 22, 2015, and which relies on and claims priority from United Kingdom patent application GB 1418921.1, filed on Oct. 24, 2014, the entire contents of both of which are incorporated herein by reference.

TECHNICAL FIELD

The disclosure relates generally to composite parts comprising fibre-reinforced structures, and more particularly manufacturing and repairing composite parts by resin infusion.

BACKGROUND OF THE ART

Resin infusion processes such as resin transfer infusion (RTI), resin transfer molding (RTM), vacuum-assisted resin transfer molding (VARTM), vacuum-assisted resin infusion (VARI) and Seemann composites resin infusion molding process (SCRIMP) are known processes used for manufacturing composite parts comprising fibre-reinforced structures. Occasionally and depending on factors associated with such infusion processes, there can be dry fabric patches at the surface of fibre-reinforced parts that were not completely impregnated with resin during the process. A conventional procedure for repairing such dry fabric patches is to apply a cosmetic resin wipe. However, this repair procedure is mainly cosmetic (i.e. non-structural) in nature and can result in the presence of structural defects such as porosity in the repaired region of the part due to air being trapped in the repaired region during the procedure.

Improvement is therefore desirable.

SUMMARY

In one aspect, the disclosure describes a device for retaining and controlling the release of resin during a resin infusion process for manufacturing or repairing fibre-reinforced composite materials. The resin retaining/releasing device comprises:
  a quantity of resin having a viscosity that is temperature dependent; and
  a first sheet and an opposite second sheet at least partially enclosing the quantity of resin, the first sheet and the second sheet being gas-permeable, the second sheet being substantially resin-impermeable when the viscosity of the resin is above a threshold viscosity and resin-permeable when the viscosity of the resin is below the threshold viscosity.

The first sheet may be substantially resin-impermeable when the viscosity of the resin is below the threshold viscosity.

The first sheet may comprise a plurality of pores sized to permit passage of gas through the first sheet and to prevent the passage of resin through the first sheet when the viscosity of the resin is below the threshold viscosity.

The second sheet may comprise a plurality of pores sized to permit passage of gas through the second sheet and to permit the passage of resin through the second sheet when the viscosity of the resin is below the threshold viscosity.

In at least one embodiment, at least one of the first sheet and the second sheet may comprise a first layer including a woven fabric and a second layer comprising a porous polytetrafluoroethylene (PTFE) membrane. The PTFE membrane of the first layer may face the resin.

The first sheet and the second sheet may be at least partially sealed to each other.

The first sheet may be resin-permeable when the viscosity of the resin is below the threshold viscosity.

The resin may comprise a one-part liquid epoxy. The threshold viscosity may be about 50 centipoise.

In another aspect, the disclosure describes an apparatus for manufacturing or repairing fibre-reinforced composite materials. The apparatus comprises:
  a vacuum barrier configured to cover an infusion region comprising a constituent of a composite material and to define a substantially sealed volume comprising the infusion region;
  a vacuum port for fluid communication with the volume;
  a device for retaining and controlling the release of resin, the device being disposed inside the volume and comprising:
  a quantity of resin having a viscosity that is temperature dependent; and
  a first sheet and an opposite second sheet at least partially enclosing the quantity of resin, the first sheet and the second sheet being gas-permeable, the second sheet being substantially resin-impermeable when the viscosity of the resin is above a threshold viscosity and resin-permeable when the viscosity of the resin is below the threshold viscosity, the second sheet of the resin retaining/releasing device forming at least part of an infusion path between the resin and the infusion region; and
  a heater configured to apply heat to the resin.

In at least one embodiment, the quantity of resin may be laterally offset from the infusion region. The vacuum port may be laterally offset from the infusion region in a lateral direction opposite that of the quantity of resin from the infusion region.

In at least one embodiment, the quantity of resin may be disposed alongside the infusion region.

The apparatus may comprise a resin distribution mesh forming part of the infusion path between the resin and the infusion region. The apparatus may comprise a release medium disposed between the resin retaining/releasing device and the distribution mesh.

The apparatus may comprise a release medium disposed between the resin retaining/releasing device and the infusion region.

The heater may comprise a heating blanket covering at least part of the resin retaining/releasing device and at least part of the infusion region.

The heater may comprise a heating blanket disposed between the resin retaining/releasing device and the infusion region. The heating blanket may comprise an infusion hole therethrough forming at least part of the infusion path.

The apparatus may comprise a first breather disposed in the volume between the resin retaining/releasing device and the vacuum barrier.

In at least one embodiment, the vacuum barrier may be a first vacuum barrier, the volume may be a first volume and the vacuum port may be a first vacuum port where the apparatus may comprise:

a second vacuum barrier covering the first vacuum barrier and being configured to define a substantially sealed second volume between the second vacuum barrier and the first vacuum barrier; and a second vacuum port for fluid communication with the second volume.

In at least one embodiment, at least part of the heater may be disposed in the second volume between the second vacuum barrier and the first vacuum barrier.

The apparatus may comprise a second breather disposed in the second volume between the second vacuum barrier and the first vacuum barrier.

The heater may comprise a first heating blanket for heating the resin retaining/releasing device and a second heating blanket for heating the infusion region.

The first heating blanket may be disposed on a first side of the infusion region and the second heating blanket may be disposed on an opposite second side of the infusion region.

The first heating blanket may be disposed between the resin retaining/releasing device and the part.

The heating blanket may comprise an infusion hole therethrough forming at least part of the infusion path.

The heater may be configured to apply heat to the infusion region of the part.

The first sheet of the resin retaining/releasing device may be substantially resin-impermeable when the viscosity of the resin is below the threshold viscosity.

The first sheet of the resin retaining/releasing device may comprise a plurality of pores sized to permit passage of gas through the first sheet and to prevent the passage of resin through the first sheet when the viscosity of the resin is below the threshold viscosity.

The second sheet of the resin retaining/releasing device may comprise a plurality of pores sized to permit passage of gas through the second sheet and to permit the passage of resin through the second sheet when the viscosity of the resin is below the threshold viscosity.

In at least one embodiment, at least one of the first sheet and the second sheet of the resin retaining/releasing device may comprise a first layer including a woven fabric and a second layer comprising a porous polytetrafluoroethylene (PTFE) membrane.

The PTFE membrane of the first layer may face the resin.

The first sheet and the second sheet may be at least partially sealed to each other.

The first sheet may be resin-permeable when the viscosity of the resin is below the threshold viscosity.

The resin may comprise a one-part liquid epoxy. The threshold viscosity is about 50 centipoise.

The first breather may comprise a woven fabric. The woven fabric may be part of a multi-layer membrane system, which may also comprise a porous polytetrafluoroethylene (PTFE) membrane.

In another aspect, the disclosure describes a method useful for manufacturing or repairing fibre-reinforced composite materials using a device for retaining and controlling the release of resin where the resin retaining/releasing device comprises a first sheet and an opposite second sheet at least partially enclosing a quantity of resin having a viscosity that is temperature dependent. The method comprises:

evacuating gas from a substantially sealed volume enclosing an infusion region comprising a constituent of a composite material by causing the gas to permeate through the first sheet and through the second sheet of the resin retaining/releasing device;

applying heat to the resin inside the resin retaining/releasing device to cause a viscosity of at least some of the resin to reach a threshold viscosity; and infusing the resin into the infusion region by directing the resin having reached the threshold viscosity to permeate through the second sheet and flow from the resin retaining/releasing device to the infusion region.

The evacuation of the gas may be performed during the infusion of the resin into the infusion region.

The evacuation of the gas may be performed after the infusion of the resin into the infusion region.

The quantity of resin may be laterally offset from the infusion region and the method may comprise directing the resin toward the infusion region.

The method may comprise applying a force on the resin to cause the resin having reached the threshold viscosity to permeate through the second sheet.

The quantity of resin may be disposed alongside the infusion region.

The method may comprise applying heat to the infusion region.

The method may comprise applying heat from a first side of the infusion region and from an opposite second side of the infusion region.

The resin may comprise a one-part liquid epoxy. The threshold viscosity may be about 50 centipoise.

The infusion region may comprise dry fabric.

The infusion region may comprise a scarfed region.

The infusion region may comprise a hole with dry fibres therein.

The infusion region may comprise dry fabric plies.

The infusion region may comprise a double-sided scarfed region.

The method may comprise evacuating gas from a substantially sealed second volume enclosing the substantially sealed first volume.

The method may comprise directing the resin having reached the threshold viscosity to permeate through a hole in a heater blanket and flow from the resin retaining/releasing device to the infusion region.

The infusion region may comprise a dry fabric patch.

The method may comprise directing the resin through a pilot hole formed in the infusion region.

In a further aspect, the disclosure describes an apparatus for manufacturing or repairing fibre-reinforced composite materials. The apparatus comprises:

a first vacuum barrier configured to cover an infusion region comprising a constituent of a composite material and to define a substantially sealed first volume comprising the infusion region;

a first vacuum port for fluid communication with the first volume;

a second vacuum barrier covering the first vacuum barrier and being configured to define a substantially sealed second volume between the second vacuum barrier and the first vacuum barrier; and a second vacuum port for fluid communication with the second volume.

a device for retaining and controlling the release of resin, the device being disposed inside the volume and comprising:

a quantity of resin having a viscosity that is temperature dependent; and a sheet retaining the quantity of resin, the sheet being substantially resin-impermeable when the viscosity of the resin is above a threshold viscosity and resin-permeable when the viscosity of the resin is below the threshold viscosity, the sheet forming at least part of an infusion path between the resin and the infusion region; and a heater configured to apply heat to the resin, the heater being disposed inside the second sealed volume between the second vacuum barrier and the first vacuum barrier.

The quantity of resin may be laterally offset from the infusion region.

The heater may comprise a heating blanket covering at least part of the resin retaining/releasing device and at least part of the infusion region.

The sheet of the resin retaining/releasing device may comprise a first layer including a woven fabric and a second layer comprising a porous polytetrafluoroethylene (PTFE) membrane.

The PTFE membrane of the first layer may face the resin.

Further details of these and other aspects of the subject matter of this application will be apparent from the detailed description and drawings included below.

DESCRIPTION OF THE DRAWINGS

Reference is now made to the accompanying drawings, in which:

FIG. 1 shows a non-destructive inspection (NDI) micrograph of a cross section of a composite part comprising porosity;

FIGS. 2A-2D respectively show higher magnification NDI micrographs at four locations within the composite part of FIG. 1;

FIG. 8A is a schematic illustration of an exemplary apparatus for infusing resin into a region of a composite part using the resin retaining/releasing device of FIGS. 3 and 4;

FIG. 8B is a micrograph of an exemplary infusion region of the composite part of FIG. 8A comprising pilot holes to permit the infusion of resin inside the composite part;

FIG. 12 is a schematic illustration of another exemplary apparatus for infusing resin into a region of a composite part where the resin of the resin retaining/releasing device is laterally offset from the region;

FIG. 13 is a schematic illustration of another exemplary apparatus for infusing resin into a scarfed region containing a constituent of a composite material;

FIG. 14 is a schematic illustration of another exemplary apparatus for infusing resin into a double-sided scarfed region containing a constituent of a composite material;

FIG. 15 is a schematic illustration of another exemplary apparatus for infusing resin into a region of a composite part where the apparatus comprises a plurality of heating blankets;

DETAILED DESCRIPTION

Figure 3:
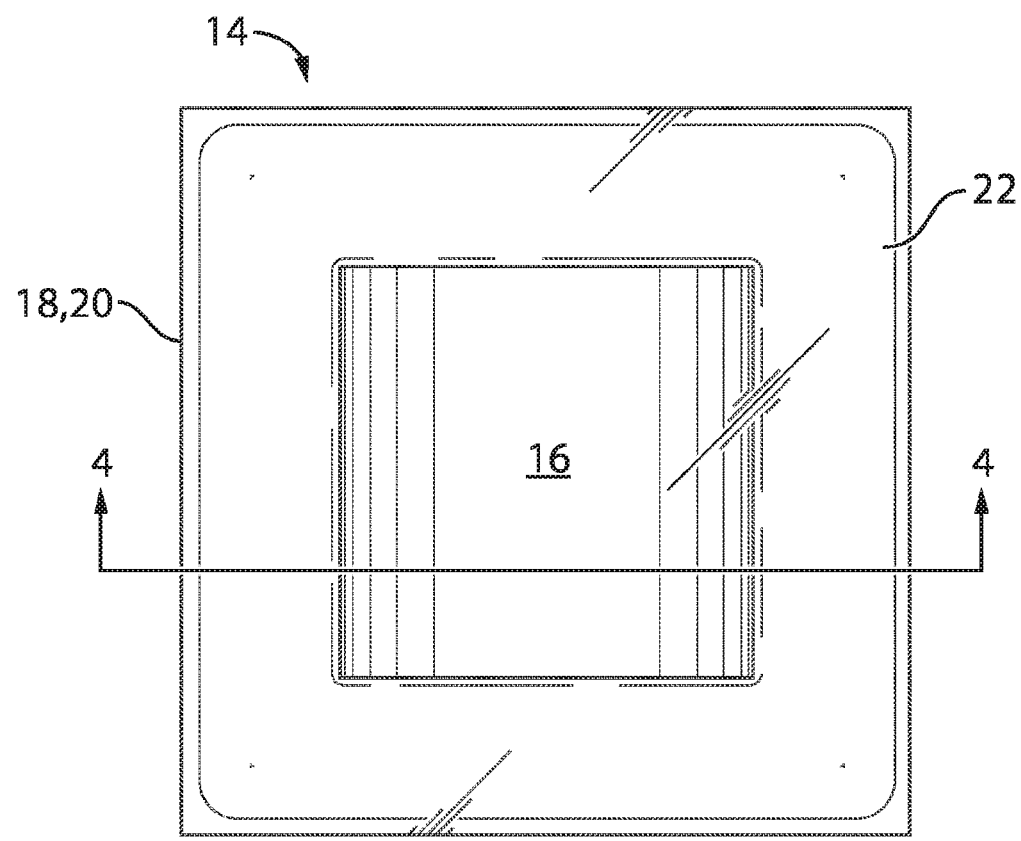
FIG. 3 is a schematic top plan view of an exemplary device for retaining and controlling the release of resin for use with a resin infusion process.

Aspects of various embodiments are described through reference to the drawings.

The present disclosure relates to apparatus and methods for manufacturing and/or repairing parts of composite materials comprising fibre-reinforced structures (e.g., containing carbon, quartz glass, e-glass and/or other fibres) by resin infusion. For example, apparatus and methods disclosed herein may be used to repair parts that have been manufactured by resin infusion processes such as resin transfer infusion (RTI), resin transfer molding (RTM), vacuum-assisted resin transfer molding (VARTM), vacuum-assisted resin infusion (VARI) and Seemann composites resin infusion molding process (SCRIMP) for example. Such parts may include parts for use in aerospace or other applications, such as for wind turbines, radomes or automotive parts. For example, within aerospace applications, such parts may include aircraft parts such as fuselage and wing components such as spars, skins and also nacelle components for aircraft engines. In some embodiments, the apparatus and methods disclosed herein may be used to repair regions of composite parts that have not been completely impregnated with resin during manufacturing or that have been damaged. For example, the apparatus and methods disclosed herein may be used to infuse resin into dry fabric patches at the surface of composite parts. The apparatus and methods disclosed herein may also be used for manufacturing new parts comprising fibre-reinforced structures by resin infusion. In various embodiments, the resin infusion referenced herein may comprise transferring resin from a resin retaining/releasing device incorporated into the layup of a resin transfer apparatus. The use of such resin retaining/releasing device in the apparatus and methods disclosed herein may improve the evacuation of gas (e.g., air and volatiles) from the region to be infused and thereby reduce the risk of obtaining porosity due to trapped gas (e.g., air) or voids due to insufficient resin quantity in the resin-infused region.

FIG. 1 shows a non-destructive inspection (NDI) micrograph obtained by X-ray computed tomography (CT) a cross-section of region 10 of a composite part comprising porosity/voids. When such porosity occurs on the plies near surface 12 only and the voids are interconnected then a repair may be carried out using a conventional cosmetic resin wipe procedure. Such procedure may comprise abrading the area, applying resin over the area, covering the area with a release film and a rubber sheet, vacuum bagging the area, allowing the resin to cure and subsequently abrading the area to the desired surface profile or surface finish if necessary. With respect to the part shown in FIG. 1, the conventional resin wipe process may be used to add resin to a dry fabric patch. However this procedure can sometimes result in air getting trapped under the resin so it can only be considered a cosmetic repair. Furthermore, if water or other contaminant is trapped in region 10 (e.g., due to water exposure) then volatiles can be released creating blisters and bubbles when the part is heated. Also if the voids are deeper below surface 12 of the part as shown in FIG. 1, the voids cannot be filled using the conventional resin wipe procedure because they are not interconnected and/or they are not in fluid communication with surface 12. In this event it may be necessary to drill small pilot holes to provide access the voids from surface 12 of the part so that resin can be transferred to the voids via the holes (see FIG. 8B). In some circumstances, if the affected area is more extensive, some or all of the fibres/resin may have to be removed and a scarf repair procedure implemented as described below.

FIGS. 2A-2D respectively show higher magnification NDI micrographs at four locations within region 10 of the composite part of FIG. 1. FIGS. 2A-2D show interstitial porosity between fibres and also between strands of the fabric in the composite material of region 10.

FIG. 3 is a schematic top plan view of an exemplary device 14 for retaining and controlling the release of resin (referred hereinafter as "resin retaining/releasing device 14") and which may be used with the apparatus and methods disclosed herein for manufacturing and/or repairing composite materials by resin infusion. In some applications, the use of resin retaining/releasing device 14 in conjunction with the apparatus and methods disclosed herein may reduce the risk of obtaining porosity due to trapped gas (e.g., air) in composite materials as shown in FIGS. 1 and 2A-2D. Specifically, in some embodiments, resin retaining/releasing device 14 may improve the ability to evacuate gas/air from a region being infused with resin 16.

Figure 4:
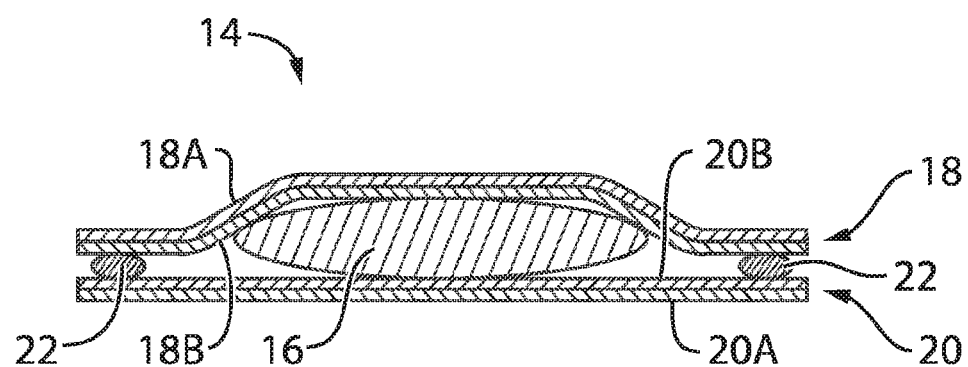
FIG. 4 is a schematic cross-sectional view of the resin retaining/releasing device of FIG. 3 taken along line 4-4 in FIG. 3.

FIG. 4 is a schematic cross-sectional view of resin retaining/releasing device 14 of FIG. 3 taken along line 4-4 in FIG. 3. In some embodiments, resin retaining/releasing device 14 may have a packet/pouch structure. In some embodiments, resin retaining/releasing device 14 may contain a quantity of resin 16 having a viscosity that is temperature dependent. For example, resin 16 may comprise a one-part liquid epoxy. In some embodiments, resin 16 may be of the type sold under the trade name CYCOM 890 by CYTEC ENGINEERED MATERIALS. In some embodiments, resin 16 may be of the type sold under the trade name HEXFLOW RTM 6 by HEXCEL. In some embodiments, resin 16 may be of the type HYSOL® EA9396 by HENKEL. In some embodiments, resin 16 may be of the type commonly known as "wipe resin". Other types of cosmetic or structural resins may also be suitable for being part of resin retaining/releasing device 14 and used in the apparatus and methods disclosed herein.

Resin retaining/releasing device 14 may comprise first sheet 18 and opposite second sheet 20 at least partially enclosing the quantity of resin 16. Second sheet 20 may be gas-permeable at temperatures typically encountered in the infusion process so that during a repair or manufacturing procedure using resin retaining/releasing device 14, gas (e.g., air) may be evacuated from resin 16 and/or from the infusion region of the composite part through second sheet 20. First sheet 18 may be gas impermeable. Alternatively, first sheet 18 may be resin permeable and gas-permeable at temperatures typically encountered in the infusion process so that during a repair or manufacturing procedure using resin retaining/releasing device 14, gas (e.g., air) may be evacuated from resin 16 and/or from infusion region 32 of composite part 34 through both first sheet 18 and second sheet 20. Second sheet 20 may be substantially resin-impermeable when the viscosity of resin 16 is above a threshold viscosity and/or below a pre-determined threshold temperature, and, resin-permeable when the viscosity of resin 16 is below the threshold viscosity and/or above the pre-determined threshold temperature. In some embodiments, first sheet 18 and second sheet 20 may be attached to each other to contain resin 16 therebetween. In some embodiments, first sheet and second sheet may be seamlessly attached together so as to form a bag with an opening for receiving the resin 16. In some embodiments, first sheet 18 and second sheet 20 may be attached together using a suitable adhesive such as double-sided tape 22. Double-sided tape 22 may be selected to withstand temperatures at which resin retaining/releasing device 14 is exposed during use. In some embodiments, double-sided tape 22 may be capable of withstanding temperatures of up to 180° C. Double-sided tape 22 may be considered to provide an at least partial sealing interface between first sheet 18 and second sheet 20. Such sealing interface may not be absolutely hermetic but may substantially prevent resin 16 from flowing out of resin retaining/releasing device 14 at least at some temperatures/viscosities of resin 16. For example, double-sided tape 22 may allow resin 16 to be substantially contained within resin retaining/releasing device 14 during handling of resin retaining/releasing device 14 prior to use in a resin infusion process as described herein. As explained below, in some embodiments, first sheet 18 and second sheet 20 may not necessarily be attached nor sealingly engaged to each other.

First sheet 18 may be of similar or identical construction to second sheet 20. Alternatively, first sheet 18 may be of different construction to second sheet 20. For example, in some embodiments, first sheet 18 may be substantially resin-impermeable when the viscosity of resin 16 is below the threshold viscosity, or, first sheet 18 may also be resin-permeable when the viscosity of resin 16 is below the threshold viscosity. In some embodiments, first sheet 18 may comprise a membrane system according to product number A2222 or Z2249 by TRANS-TEXTIL. In some embodiments, second sheet 18 may comprise a membrane system according to product number Z2249 by TRANS-TEXTIL.

First sheet 18 and/or second sheet 20 may respectively comprises first layer 18A, 20A which may include a woven fabric and second layer 18B, 20B which may comprise a porous membrane. First layer 18A, 20A may be bonded to second layer 18B, 20B so that one or both of first sheet 18 and second sheet 20 may cooperate together to form a membrane system. In some embodiments, the porous membrane of second layer 18B, 20B may face resin 16 and the woven fabric of first layer 18A, 20A may face outwardly from resin 16. Alternatively, in some embodiments, the woven fabric of first layer 18A, 20A may face resin 16 and the porous membrane of second layer 18B, 20B may face outwardly from resin 16. The woven fabric of first layer 18A, 20A may be gas permeable. The woven fabric may also be resin-permeable at least when the viscosity of resin 16 is below the threshold viscosity. The porous membrane of second layer 18B, 20B may comprise a porous polytetrafluoroethylene (PTFE) membrane. For example, porous membrane of second layer 18B, 20B may comprise a microporous PTFE membrane.

Figure 5:
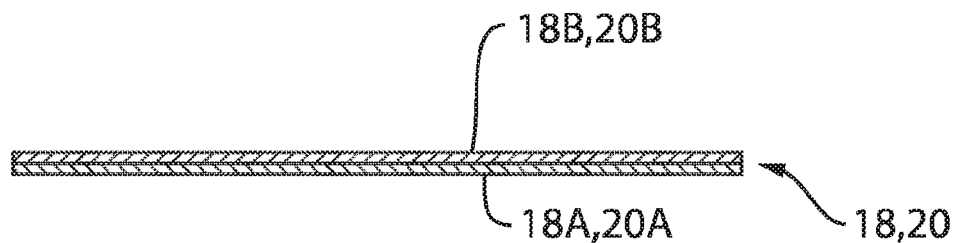
FIG. 5 is a schematic cross-sectional view of an exemplary sheet of the resin retaining/releasing device of FIG. 3.

FIG. 5 is a schematic representation of an exemplary first and/or second sheet 18, 20 of resin retaining/releasing device 14 illustrating first layer 18A, 20A and second layer 18B, 20B adjoining each other.

Figures 6A, 6B:
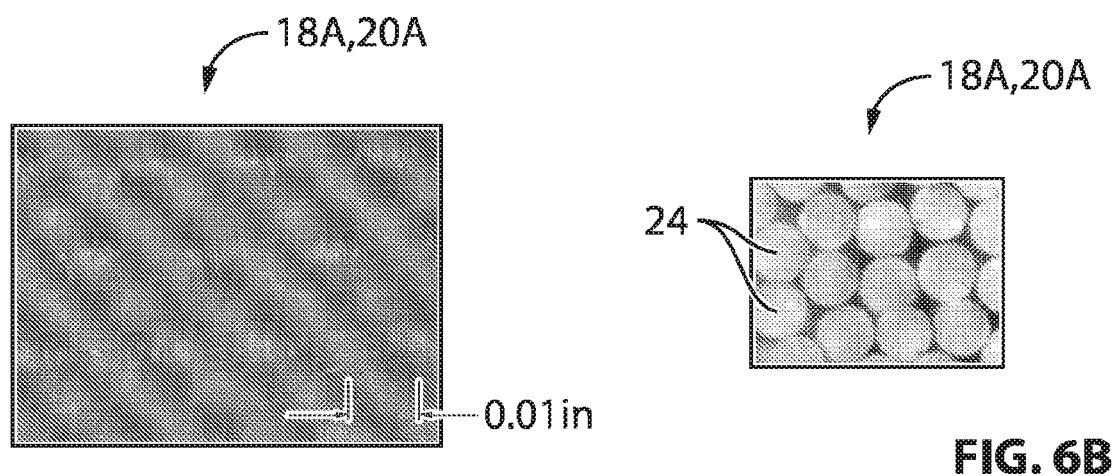
FIGS. 6A and 6B are micrographs of an exemplary woven fabric component of the sheet of FIG. 5.

FIGS. 6A and 6B are magnified photographs of an exemplary woven fabric which may be part of first layer 18A, 20A of first sheet 18 and/or second sheet 20. The magnification in FIG. 6B is higher than that of FIG. 6A. FIG. 6A shows a plan view of the woven fabric that may comprise a plurality of tows made up of polyester filaments 24. FIG. 6B shows a cross-sectional view of one tow comprising individual filaments 24 bunched together. The woven fabric may have a relatively tight weave with relatively small spaces between individual filaments 24 to permit gas and/or resin 16 of relatively low viscosity to permeate through the woven fabric of first layer 18A, 20A.

Figures 7A, 7B:
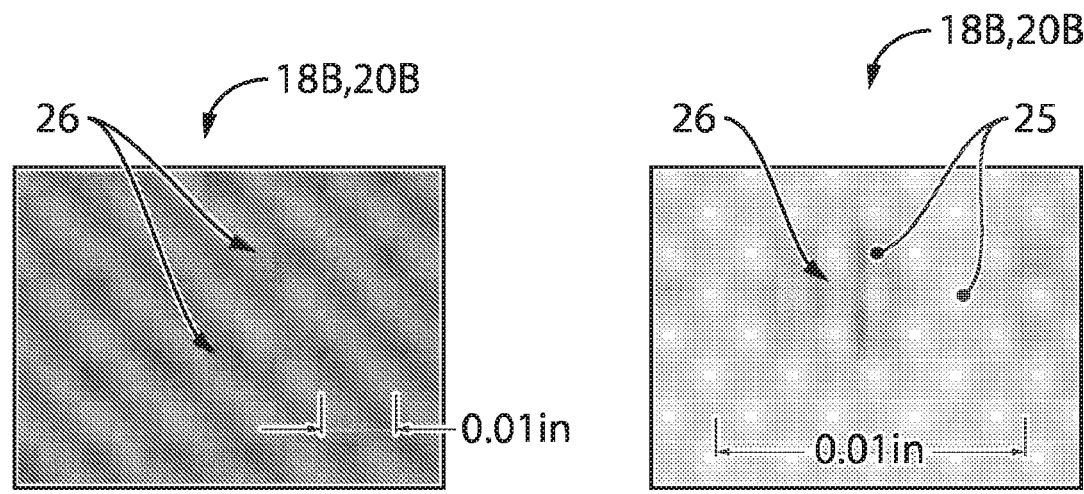
FIGS. 7A and 7B are micrographs of an exemplary porous membrane component of the sheet of FIG. 5.

FIGS. 7A and 7B are magnified photographs of an exemplary PTFE membrane which may be part of second layer 18B, 20B of first sheet 18 and/or second sheet 20. PTFE membrane may comprise a PTFE alloy. In some embodiments, PTFE membrane may comprise an expanded PTFE material also known as ePTFE. The magnification in FIG. 7B is higher than that of FIG. 7A. The PTFE membrane of second layer 18B, 20B may be porous. For example, PTFE membrane of second layer 18B, 20B may comprise a plurality of pores 25 sized according to known or other methods (e.g., based on the surface tension of resin 16) to permit passage of gas through the PTFE membrane and to prevent the passage of resin 16 through the PTFE membrane when the viscosity of resin 16 is above the threshold viscosity. Pores 25 in the PTFE membrane are relatively small and cannot be clearly shown in FIGS. 7A and 7B due to insufficient magnification. Nevertheless, exemplary pores 25 are shown schematically and not to scale in FIG. 7B for illustration purpose.

FIGS. 7A and 7B also show a plurality of thinned or otherwise weakened regions 26 that are distributed across the PTFE membrane of second layer 18B, 20B. Weakened regions 26 are shown as translucent areas in FIGS. 7A and 7B. When heat is applied to resin 16, the PTFE membrane may also be heated and weakened regions 26 may soften and thereby cause at least some of pores 25 in the PTFE membrane to also soften (i.e., become less rigid) and expand to a size allowing resin 16 to permeate the PTFE membrane when the viscosity of resin 16 has reached or dropped below a certain threshold due to heating of resin 16. PTFE membrane may be configured so that the expansion of pores 25 to a size suitable for allowing resin 16 at the desired viscosity to permeate the PTFE membrane occurs at a pre-determined temperature. In other embodiments, PTFE membrane may not necessarily include such weakened regions 26 but may instead comprise pores 25 that are appropriately sized to achieve similar results. In any case, the PTFE membrane of second layer 18B, 20B may comprise a plurality of pores 25 sized to permit passage of gas through first sheet 18 and/or second sheet 20 and also permit the passage of resin 16 through first sheet 18 and/or second sheet 20 when the viscosity of resin 16 is below the threshold viscosity.

Other types of (e.g., perforated) sheets 18, 20 than those disclosed herein may also be suitable in some situations. The threshold viscosity and optionally the temperature of resin 16 reached during a resin infusion process may be used as a basis for selecting a suitable (e.g., pore size in) first sheet 18 and/or second sheet 20. The threshold viscosity and the temperature of resin 16 may be selected based on the specific application and process parameters. For example, the pore size may be selected based on the desired viscosity and flow rate of resin 16 during infusion. In some embodiments, the threshold viscosity below which resin 16 may permeate through first sheet 18 and/or second sheet 20 may be about 50 centipoise. Depending on the type of resin 16, the temperature at which the threshold viscosity may be achieved may be at about 140° C.

FIG. 8A shows a schematic, cross-sectional view of an exemplary apparatus 30 for infusing resin 16 into region 32 (referred hereinafter as "infusion region 32") of a part 34 comprising a fibre-reinforced structure by infusion of resin 16. Apparatus 30 may comprise resin retaining/releasing device 14 as described above. Infusion region 32 may comprise a damaged region of part 34 or a patch of dry fabric that was not sufficiently impregnated with resin during manufacturing. Alternatively, apparatus 30 may be used to manufacture a new part 34 or a portion thereof where infusion region 32 may comprise a woven fabric or other filaments (e.g., fibres) that may serve as a substrate for a new manufactured part. In any case, infusion region 32 may comprise one or more constituents of a composite material to be impregnated with resin 16 from resin retaining/releasing device 14. Such constituent may, for example, comprise quartz glass, e-glass and/or carbon fibres, carbon black, carbon nano tubes and/or graphene. A suitable release medium 38 may be disposed above region 32. Release medium 38 may include various varieties of oils, greases, and other polymers having relatively low strength. In some embodiments, release medium 38 may comprise a cohesively formed plastic that does not readily adhere to other polymers or other type of known or other release medium. For example, release medium 38 may be configured to not chemically bond to the part 34 so that it may be easily removed by peeling after resin infusion. In some embodiments, release medium 38 may comprise a PTFE coated fibreglass fabric of the type sold under the trade name RELEASE EASE® by AIRTECH.

In some embodiments, apparatus 30 may comprise first (e.g., inner) vacuum barrier 40 configured to cover infusion region 32 of part 34 and to be substantially sealingly engaged to part 34 around infusion region 32 of part 34 to define a first volume 41 between first vacuum barrier 40 and part 34. Disposed within first volume 41 is the resin retaining/releasing device 14. Sealing between first vacuum barrier 40 and part 34 may be achieved via one or more suitable sealing members 42. First vacuum barrier 40 may comprise a suitable polymer (e.g., nylon) flexible sheet and may be of the type(s) typically used as flexible bagging membranes (i.e., vacuum bags) in known or other resin infusion processes. Vacuum barrier 40 may be substantially gas-impermeable. In some embodiments, sealing members 42 may comprise a suitable sealant or double-sided tape. Sealing between first vacuum barrier 40 and part 34 may not be absolutely hermetic but may be suitable for achieving at least some differential pressure (e.g., a residual pressure of 3 millibars) between first volume 41 and the atmosphere. In some embodiments, vacuum barrier 40 may be of the same material as first sheet 18 and/or second sheet 20 of resin retaining/releasing device 14.

Apparatus 30 may comprise first vacuum port 44 for fluid communication with first volume 41. Vacuum port 44 may be coupled to a vacuum source (shown in FIGS. 9A and 9B) that may be used to evacuate gas/air from first volume 41 prior, during and/or after the transfer of resin 16 to infusion region 32. Vacuum port 44 may be located in a relatively low temperature zone away from infusion region 32. For example, vacuum port 44 may be located in a region where the temperature is typically lower than 120° C. even during curing of resin 16 in infusion region 32. In some embodiments, vacuum port 44 may be located in a region where the temperature does not significantly exceed room/ambient temperatures. Accordingly, resin 16 may not typically flow to vacuum port 44. Nevertheless vacuum port 44 may be covered by a suitable barrier 45 to prevent resin 16 from entering vacuum port 44. In some embodiments, barrier 45 may be of the same material as first sheet 18 and/or second sheet 20 of resin retaining/releasing device 14. Evacuation of first volume 41 via first vacuum port 44 may cause at least some the air and moisture to be evacuated from infusion region 32 and also from resin 16 and may reduce the likelihood of porosity being formed in infusion region 32 as a result of the infusion of resin 16.

Apparatus 30 may comprise resin retaining/releasing device 14 as described above disposed inside first volume 41 and part of the layup of apparatus 30. Resin retaining/releasing device 14 may comprise a quantity of resin 16 having a viscosity that is temperature dependent. Resin retaining/releasing device 14 may comprise first sheet 18 and opposite second sheet 20 at least partially enclosing the quantity of resin 16. First sheet 18 and second sheet 20 may be gas-permeable. Second sheet 20 may be substantially resin-impermeable when the viscosity of resin 16 is above a threshold viscosity and resin-permeable when the viscosity of resin 16 is below the threshold viscosity. Second sheet 20 of resin retaining/releasing device 14 may form at least part of an infusion path between resin 16 and infusion region 32. Apparatus 30 may also comprise heater 46 configured to apply heat to resin 16. Heater 46 may comprise one or more electrically-powered heating blankets or other means suitable to transfer heat to resin 16 and/or infusion region 32. For example, in some embodiments, heating blanket(s) 46 may cover at least part of resin retaining/releasing device 14 and/or at least part of infusion region 32. Heating blanket(s) 46 may be disposed outside of first volume 41. For example, heating blanket(s) 46 may be disposed outside of and against first vacuum barrier 40 and overlay at least part of the layup of components in first volume 41.

Apparatus 30 may also comprise distribution mesh 48 forming part of the infusion path between resin 16 and infusion region 32. Distribution mesh 48 may assist in causing resin 16 to be distributed (i.e., spread) over and infused into infusion region 32 once at least some of resin 16 has reached a temperature where the viscosity of resin 16 is below the threshold viscosity and resin 16 has begun permeating second sheet 20. Second sheet 20 of resin retaining/releasing device 14 may be disposed between resin 16 and infusion region 32. In some embodiments, resin retaining/releasing device 14 may be disposed alongside (e.g., above, in line with) infusion region 32 of part 34 so that the path which resin 16 must follow to reach infusion region 32 is relatively short. Release medium 38 may be disposed between resin retaining/releasing device 14 and infusion region 32. For example release medium 38 may be disposed between resin retaining/releasing device 14 and distribution mesh 48. Release medium 38 may be disposed between distribution mesh 48 and infusion region 32.

Apparatus 30 may comprise first breather 50 disposed in first volume 41 between resin retaining/releasing device 14 and first vacuum barrier 40. For example, first breather 50 may be disposed between first sheet 18 of resin retaining/releasing device 14 and first vacuum barrier 40. Breather 50 may provide passage space for gas/air drawn under vacuum from different regions of first volume 41 toward vacuum port 44. The application of a vacuum via vacuum port 44 will tend to collapse first vacuum barrier 40 and pressurize resin retaining/releasing device 14 and the layup of components inside first volume 41 due to the ambient overpressure. In some circumstances the magnitude of the vacuum inside of first volume may be about a residual pressure of 3 millibars in relation to the atmosphere. Breather 50 may serve to provide a structural limitation on vacuum barrier 40 and prevent vacuum barrier 40 from closing off outlet passages for escaping gas/air leaving first volume 41 during resin infusion. Breather 50 may comprise known or other types of breathers. In some embodiments, breather 50 may comprise the same material as one of first sheet 18 and second sheet 20 of resin retaining/releasing device 14 as described above. For example, breather 50 may comprise a membrane system according to product number A2222 or Z2249 by TRANS-TEXTIL. For example breather 50 may comprise a membrane system comprising first layer (e.g., woven fabric) such as 18A or 20A and a second layer (e.g., porous membrane) such as 18B or 20B as described above in relation to resin retaining/releasing device 14.

Apparatus 30 may comprise flexible second (e.g., outer) vacuum barrier 52 covering first vacuum barrier 40 and being configured to be substantially sealingly engaged to part 34 to define second volume 54 between second vacuum barrier 52 and first vacuum barrier 40. For example, second vacuum barrier 52 may completely cover first vacuum barrier 40 and enclose first volume 41. Second vacuum barrier 52 may also be substantially gas-impermeable and may be of the same or of different type than first vacuum barrier 40. Apparatus 30 may comprise second vacuum port 56 for fluid communication with second volume 54. Vacuum port 56 may be coupled to a vacuum source that may be used to evacuate gas/air from second volume 54 during the transfer of resin 16 to infusion region 32. Second vacuum barrier 52 may provide some redundancy (e.g., a back-up) for first vacuum barrier 40. For example, the use of second vacuum barrier 52 may help prevent or hinder outside/atmospheric air from penetrating first volume 41 via sealing member 42 disposed between first vacuum barrier 40 and part 34. The application of a vacuum to second volume 54 via vacuum port 56 may help the evacuation of first volume 41 of air and moisture and may reduce the likelihood of porosity being formed in region 32 as a result of the infusion of resin 16.

Second breather 58 may be disposed in second volume 54 between second vacuum barrier 52 and first vacuum barrier 40. Second breather 58 may be of the same or of different type than first breather 50 described above. For example, second breather 58 may be disposed between second vacuum barrier 52 and first vacuum barrier 40. Second breather 58 may provide passage space for gas/air drawn under vacuum from different regions of second volume 54 toward vacuum port 56. The application of a vacuum via vacuum port 56 will tend to collapse second vacuum barrier 52 and pressurize the layup of components inside first volume 41 and second volume 54 due to the ambient overpressure. Second breather 58 may serve to provide a structural limitation on second vacuum barrier 52 and prevent second vacuum barrier 52 from closing off outlet passages for escaping gas/air leaving second volume 54 during resin infusion.

One or more heating blanket(s) 46 or other suitable heating means may be disposed inside second volume 54 between second vacuum barrier 52 and first vacuum barrier 40. In such configuration, first vacuum barrier 40 may substantially prevent direct contact between resin 16 and heating blanket(s) 46. For example, heating blanket(s) 46 may be disposed between second breather 58 and first vacuum barrier 40.

Apparatus 30 may also comprise tow 60 that may be attached to part 34 via a suitable adhesive. In some embodiments, tow 60 may be secured to part 34 via tape 62 (referred hereinafter as "blue tape 62") that is suitable to withstand temperatures associated with resin infusion processes. Such tape 62 may be blue composite bonding tape of the type sold under the trade name FLASHBREAKER 1 by AIRTECH. Tow 60 may comprise an untwisted bundle of filaments made of glass or carbon. Tow 60 may prevent or hinder resin 16 from spreading too far beyond infusion region 32. Tow 60 may have a number of functions. For example, the small thickness of tow 60 may not significantly interfere with heater blanket 46 or other components of the layup however it may provide a path between vacuum port 44 and infusion region 32 so as to permit the evacuation of air from infusion region 32. Another function of tow 60 may be that by virtue of the small capillaries created between tows, it may prevent resin 16 from flowing out of infusion region 32 and toward vacuum port 44.

FIG. 8B is a micrograph of an exemplary infusion region 32 of the composite part 34 of FIG. 8A comprising pilot holes 63 to permit the infusion of resin 16 inside part 34. As explained above, one or more pilot holes 63 may be used when the voids are below the surface of part 34 and are not in fluid communication with the surface of part 34. After the infusion of resin 16 into infusion region 32, holes 63 may get filled with resin 16 and as such become part of the repaired composite part 34. In some embodiments, holes 63 may be at least partially filled with one or more constituents (e.g., structural fibres, fillers) of a composite material to be impregnated with resin 16. As explained above, such constituent may, for example, comprise quartz glass, e-glass and/or carbon fibres, carbon black, carbon nano tubes and/or graphene.

Figure 9A:
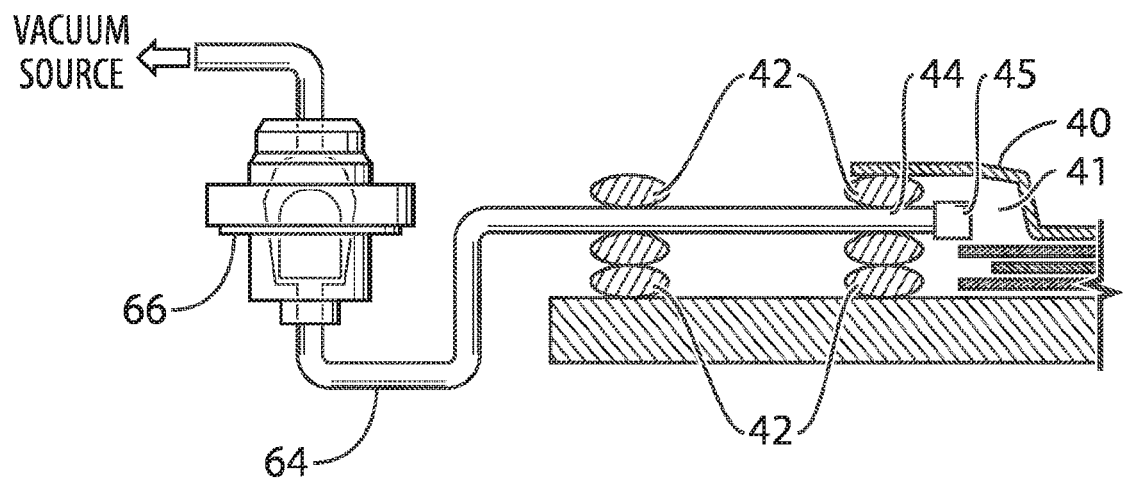
FIGS. 9A and 9B show partial schematic illustrations of part of apparatus 30 showing vacuum port 44 being connected to a vacuum source.

FIG. 9A shows a schematic illustration of a portion of apparatus 30 showing vacuum port 44 being connected to a vacuum source (e.g., vacuum pump). For example, vacuum port 44 may be connected to the vacuum source via tube 64, which may be made of nylon. The position of vacuum port 44 should be far enough away from resin retaining/releasing device 14 to prevent resin 16 from entering vacuum port 44 and reaching the vacuum source. Also, in view of the precautions described above, the likelihood of resin 16 reaching the vacuum source via vacuum port 44 may be relatively low. Nevertheless, as additional precaution, optional resin trap 66 may be connected in line with nylon tube 64 so as to prevent resin 16 entering vacuum port 44 from reaching the vacuum source. Resin trap 66 may be configured to block a passage between vacuum port 44 and the vacuum source once a certain amount of resin 16 has been accumulated in resin trap 66. Second vacuum port 56 may be coupled to the same or to a different vacuum source than first vacuum port 44.

Figure 9B:
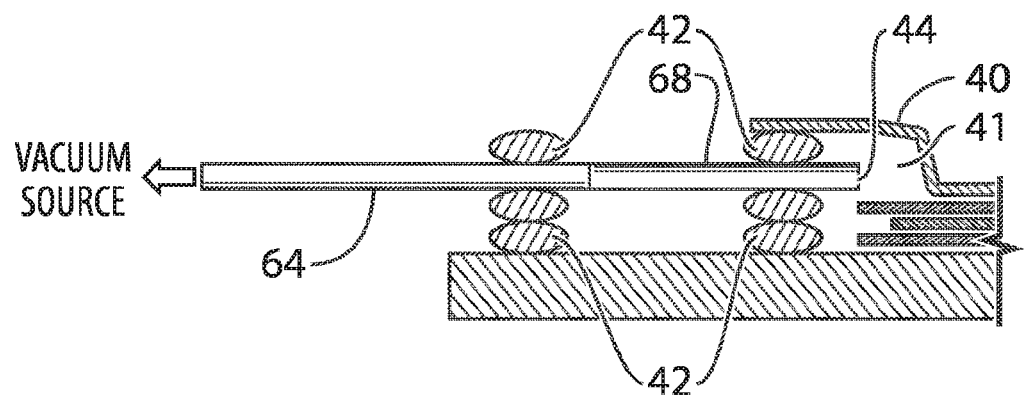

FIG. 9B shows another schematic illustration of a portion of apparatus 30 showing vacuum port 44 being connected to the vacuum source. Again, vacuum port 44 may be connected to the vacuum source via tube 64, which may be made of nylon, copper or PTFE. Instead of resin trap 66 a bunch of glass tows 68 may be disposed inside nylon tube 64 so as to substantially prevent resin 16 from getting to the vacuum source in the event where some of resin 16 would enter vacuum port 44.

Figure 10A:
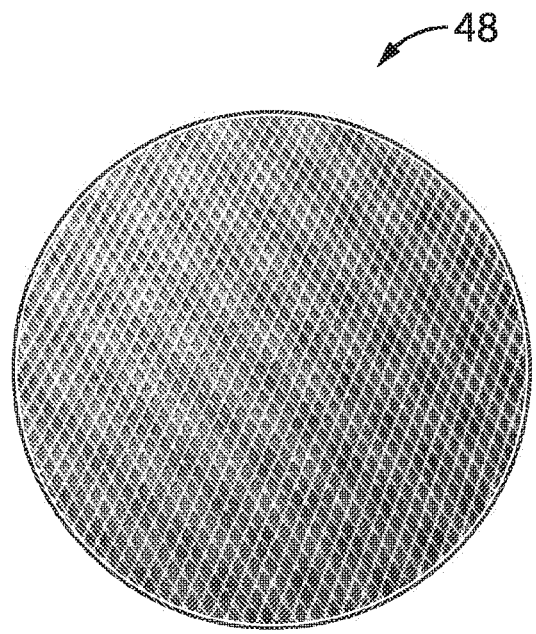
FIGS. 10A and 10B are photographs of an exemplary resin distribution mesh of the apparatus of FIG. 8A at different magnifications.
Figure 10B:
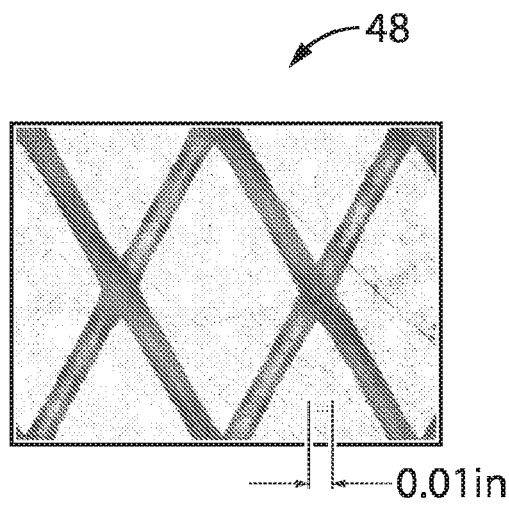

FIGS. 10A and 10B are photographs of an exemplary embodiment of distribution mesh 48. As explained above, distribution mesh 48 may help resin 16 spread across infusion region 32 during resin infusion. Distribution mesh 48 may be configured as a net and may be made of nylon. FIG. 10B shows a magnified photograph of distribution mesh 48 showing that the majority of distribution mesh 48 may be open area through which resin 16 may flow during resin infusion.

Figure 11A:
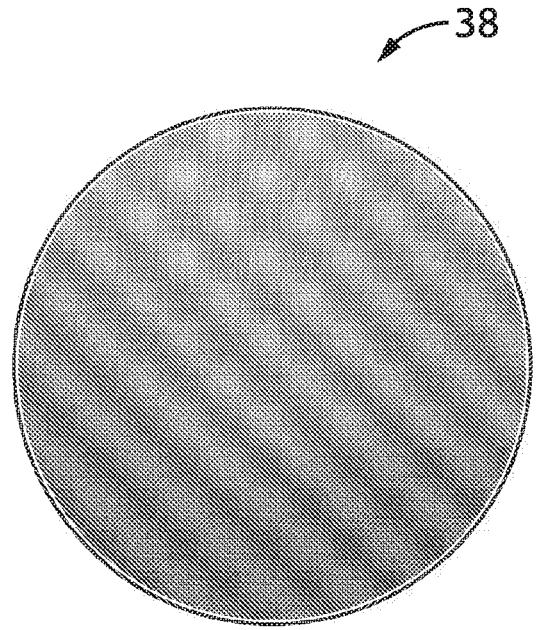
FIGS. 11A and 11B are photographs of an exemplary release medium of the apparatus of FIG. 8A.
Figure 11B:
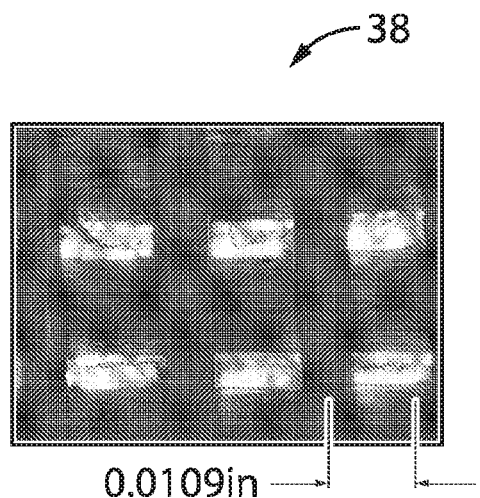

FIGS. 11A and 11B are photographs of an exemplary embodiment of release medium 38. As described above, release medium 38 may comprise a cohesively formed plastic that does not readily adhere to other polymers. For example, release medium 38 may comprise a PTFE coated fibreglass fabric of the type sold under the trade name RELEASE EASE® by AIRTECH. FIG. 11B shows a magnified photograph of release medium 38 showing a plurality of openings through which resin 16 may permeate during the resin infusion process.

FIG. 12 is a schematic illustration of another exemplary apparatus 30 for infusing resin 16 into region 32 of part 34 comprising a fibre-reinforced structure by resin infusion. Apparatus 30 of FIG. 12 comprises elements previously illustrated and described above therefore such description will not be repeated. In FIG. 12, infusion region 32 may be integral to part 34. For example, infusion region 32 may comprise an area of dry fibres which was not completely impregnated by resin during manufacturing or a damaged area of part 34.

FIG. 12 also shows that resin retaining/releasing device 14, and hence quantity of resin 16 therein, may be laterally offset from infusion region 32 of part 34. Accordingly, distribution mesh 48 may extend laterally to form at least part of a resin path between resin retaining/releasing device 14 and infusion region 32. For example, distribution mesh 48 may extend laterally to cover infusion region 32 but also be disposed under resin retaining/releasing device 14 so that resin 16 permeating through second sheet 20 may be directed to infusion region 32 via distribution mesh 48. In some applications, the lateral offset of resin retaining/releasing device 14 from infusion region 32 may be advantageous in providing a desired surface finish over infusion region 32. For example, the layup of components directly above infusion region 32 may be relatively flat and/or smooth and therefore the risk of having wrinkles, which could negatively impact surface finish, in the layup may be reduced.

First vacuum port 44 may be laterally offset from infusion region 32 of part 34 in a lateral direction opposite that of the quantity of resin 16 from infusion region 32. For example, in FIG. 12 resin 16 is shown as being positioned to the right of infusion region 32 and first vacuum port 44 is shown as being positioned the left of infusion region 32. The relative positions of first vacuum port 44 and resin retaining/releasing device 14 may also favor the flow of resin 16 from the area of resin retaining/releasing device 14 to infusion region 32. For example, the evacuation of first volume 41 via first vacuum port 44 may cause first vacuum barrier 40 to collapse, compress the area of resin retaining/releasing device 14 and promote the permeation of resin 16 through second sheet 20. The evacuation of first volume 41 via first vacuum port 44 may also help draw resin 16 from the area of resin retaining/releasing device 14 laterally toward first vacuum port 44 and consequently toward infusion region 32 disposed between the area of resin retaining/releasing device 14 and first vacuum port 44.

As shown in FIG. 12, heating blanket(s) 46 may be positioned to apply heat to both infusion region 32 and the area of resin retaining/releasing device 14. Accordingly, heating blanket(s) 46 may cover both infusion region 32 and the area of resin retaining/releasing device 14 and also extend between infusion region 32 and the area of resin retaining/releasing device 14 so that a path along which resin 16 may flow may also be heated.

FIG. 13 is a schematic illustration of another exemplary apparatus 30 for infusing resin into region 32 of part 34 comprising a fibre-reinforced structure by resin infusion. Apparatus 30 of FIG. 13 comprises elements previously illustrated and described above therefore such description will not be repeated. In FIG. 13, infusion region 32 may be integral to part 34. For example, infusion region 32 may comprise a scarfed region filled with dry fibres or fabric to be infused with resin 16. For example, the scarfed region of infusion region 32 may be at least partially filled with dry carbon fabric plies to be infused with resin 16. Infusion region 32 may comprise a removed damaged portion (e.g., high porosity level that has been physically removed) of part 34 that has been machined to have a scarfed configuration and filled with dry fibres or fabric and/or other constituent(s) of a composite material prior to resin infusion. In some situations, it may be desirable to use a film adhesive in infusion region 32 and disposed between the composite material constituent(s) and part 34. For example, the use of such film adhesive may adhesively bond the dry fibres or fabric to part 34 and may also result in a structurally stronger repaired infusion region 32 after curing of resin 16. The use of the various apparatus 30, 80 and methods 100 disclosed herein may also permit off-gassing the adhesive (i.e., removing air or volatiles) prior to infusing resin 16 into infusion region 32. An example of a film adhesive that may be suitable for some applications may be FM® 300-2 adhesive system sold by CYTEC ENGINEERED MATERIALS.

Infusion region 32 may extend through part 34 and therefore third vacuum barrier 70 may be disposed on opposite side of part 34 and substantially sealed to part 34 via sealing member 42. Third vacuum barrier may be of the same type as first vacuum barrier 40 and/or second vacuum barrier 52. Third vacuum barrier 70 may substantially prevent or hinder air from entering first volume 41 while first volume 41 is being evacuated via first vacuum port 44. Accordingly, first vacuum barrier 40 and third vacuum barrier 70 may cooperate to define first volume 41.

FIG. 14 is a schematic illustration of another exemplary apparatus 30 for infusing resin into region 32 of part 34 comprising a fibre-reinforced structure by resin infusion. Apparatus 30 of FIG. 14 comprises elements previously illustrated and described above therefore such description will not be repeated. In FIG. 14, infusion region 32 may be integral to part 34. For example, infusion region 32 may comprise a double-sided scarfed region filled with dry fibres or fabric to be infused with resin 16. For example, infusion region 32 may be at least partially filled with dry carbon fabric plies to be infused with resin 16. Infusion region 32 may comprise a damaged portion of part 34 that has been removed from part 34 and machined to have a double-sided scarfed configuration prior to resin infusion.

FIG. 15 is a schematic illustration of another exemplary apparatus 30 for infusing resin 16 into region 32 of part 34 comprising a fibre-reinforced structure by resin infusion. Apparatus 30 of FIG. 15 comprises elements previously illustrated and described above therefore such description will not be repeated. FIG. 15 shows that in various embodiments disclosed herein a plurality of heating blankets 46A, 46B may be used to provide heat to part 34 and/or resin 16. For example, one or more first heating blankets 46A may be disposed on one side of infusion region 32 (and of part 34) and one or more second heating blankets 46B may be disposed on another (e.g., opposite) side of infusion region 32 (and of part 34). The number and locations of heating blankets 46A, 46B may be selected based on the particular heating requirements for resin infusion. The number and locations of heating blankets 46A, 46B may also depend on one or more of the type, shape and size of infusion region 32, of part 34 and/or of resin retaining/releasing device 14. For example, first heating blanket(s) 46A may be disposed in first volume 41 defined at least in part by first vacuum barrier 40 and third vacuum barrier 70, and, second heating blanket 46B may be disposed in second volume 54 defined at least in part by first vacuum barrier 40 and second vacuum barrier 52. First heating blanket 46A and second heating blanket 46B may be controlled independently of each other in some embodiments.

Figure 16:
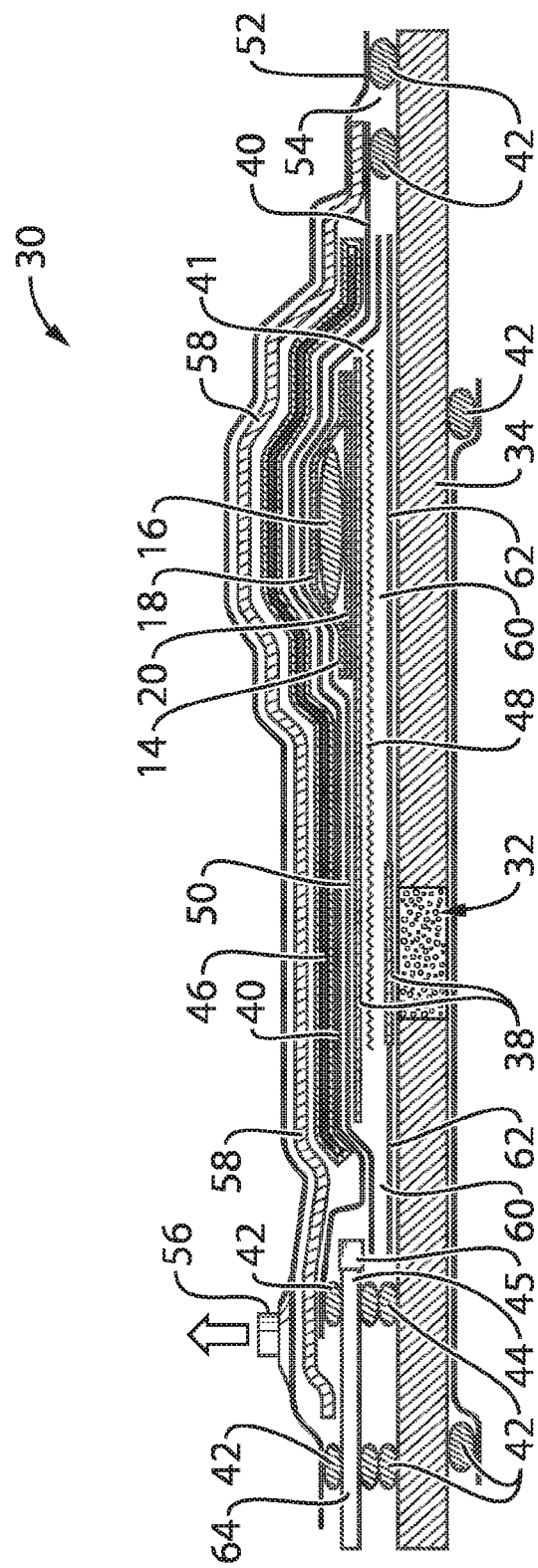
FIG. 16 is a schematic illustration of another exemplary apparatus for infusing resin into a region of a composite part comprising a hole containing a constituent of a composite material.

FIG. 16 is a schematic illustration of another exemplary apparatus 30 for infusing resin into region 32. Apparatus 30 of FIG. 16 comprises elements previously illustrated and described above therefore such description will not be repeated. In various embodiments disclosed herein, region 32 may comprise one or more holes at least partially filled with one or more constituents of a composite material to be infused with resin 16 as described above. For example, the hole(s) in infusion region 32 may contain dry and relatively short fibres.

Based on the examples of apparatus 30 disclosed herein, it is understood that in various embodiments, resin infusion into the various types of regions 32 (e.g., dry fibres, scarfed region, double-sided scarfed region and hole filled with short fibres, etc.) could be achieved whether or not resin retaining/releasing device 14 is laterally offset from infusion region 32.

Figure 17:
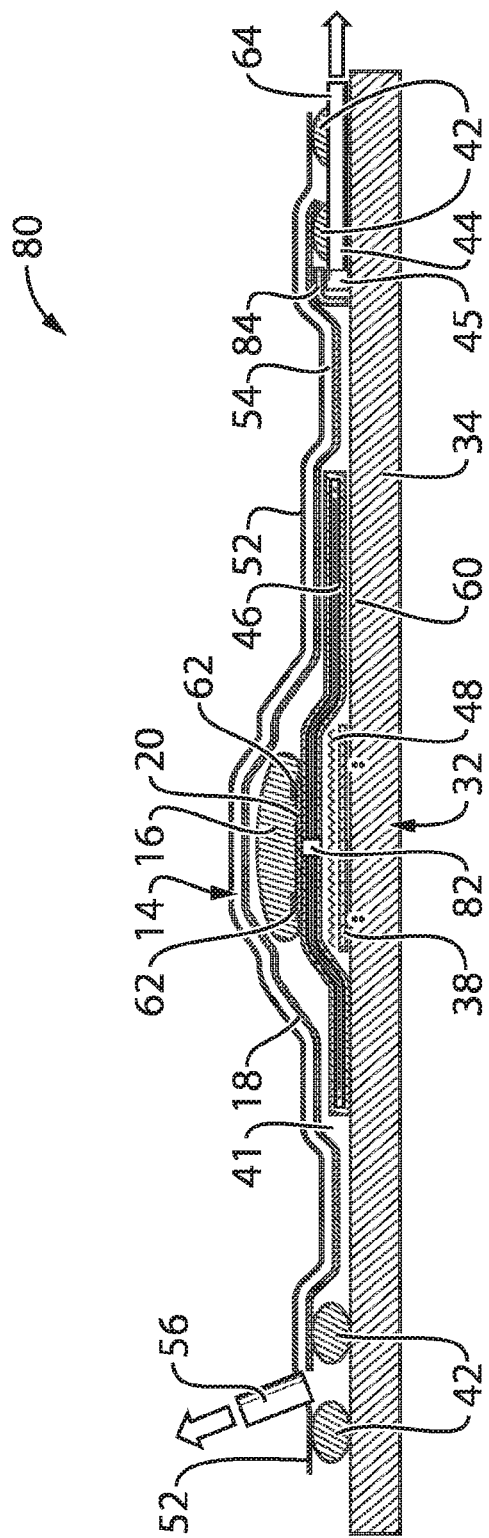
FIG. 17 is a schematic illustration of another exemplary apparatus for infusing resin into a region of a composite part using a resin retaining/releasing device according to another embodiment.

FIG. 17 is a schematic illustration of an exemplary apparatus 80 for infusing resin 16 into region 32 of part 34 comprising a composite material using resin retaining/releasing device 14 according to another embodiment. Apparatus 80 of FIG. 16 comprises elements previously illustrated and described above in relation to apparatus 30 and therefore such description will not be repeated. Like reference numerals have been used to represent like elements. As mentioned above, first sheet 18 and second sheet 20 may retain (e.g., fully or partially enclose) a quantity of resin 16. In apparatus 80, first sheet 18 and second sheet 20 may not be attached or sealed to each other. Nevertheless, first sheet 18 and opposite second sheet 20 may still at least partially enclose the quantity of resin 16. First sheet 18 and second sheet 20 may of the same type(s) and have the same properties as described above.

First sheet 18 may also serve as first (e.g., inner) vacuum barrier 40 and as first breather 50 described above in relation to apparatus 30 and may be in substantial sealing engagement with part 34 via sealing member(s) 42. Accordingly, first sheet 18 may define at least part of first volume 41. However, as described above, first sheet 18 may not be gas-impermeable as first vacuum barrier 40 of the apparatus 30. Apparatus 80 may comprise second (e.g., outer) vacuum barrier 52 which may be configured and function as described above in relation to apparatus 30 and define second volume 54. Since first sheet 18 may be gas permeable, first volume 41 and second volume 54 may permit gas communication between each other through first sheet 18.

As explained above, second sheet 20 may be gas-permeable and also resin permeable when the viscosity of resin 16 is below a threshold and optionally when the temperature of resin 16 has reached a threshold temperature. Accordingly, second sheet 20 may form at least part of the resin path between resin 16 and infusion region 32. Second sheet 20 may be attached to heating blanket(s) 46 via blue tape 62. Heating blanket(s) 46 may be disposed inside first volume 41. For example, heating blanket(s) 46 may be disposed between the area of resin retaining/releasing device 14 and infusion region 32. In some embodiments, heating blanket(s) 46 may be disposed between second sheet 20 of resin retaining/releasing device 14 and infusion region 32. Heating blanket(s) 46 may be configured to apply heat to resin 16 and also infusion region 32. Heating blanket(s) 46 may comprise one or more infusion holes 82 (referred hereinafter as "infusion hole 82") extending therethrough and forming at least part of the infusion path between resin 16 and infusion region 32. Accordingly, when the viscosity of resin 16 is at or below the threshold required to permeate second sheet 20, resin 16 may flow through heating blanket(s) 46 via infusion hole 82 toward infusion region 32. Distribution mesh 48 may help resin 16 in spreading across infusion region 32. Infusion region 32 may be of any of the types previously explained above. Apparatus 80 may also comprise one or more additional breathers 84 that may prevent first sheet 18 from occluding first vacuum port 44 when first volume 41 is evacuated via first vacuum port 44.

Figure 18:
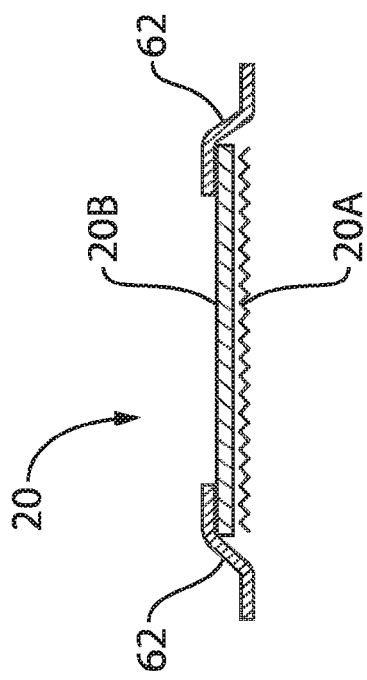
FIG. 18 is an enlarged schematic cross-sectional view of the second sheet of the resin retaining/releasing device of FIG. 17.

FIG. 18 is an enlarged schematic illustration of second sheet 20 of resin retaining/releasing device 14 of apparatus 80. Second sheet 20 may be attached to heater blanket(s) 46 via blue tape 62. Second sheet 20 may be disposed such that second layer 20B (e.g., the PTFE membrane) faces resin 16. Alternatively, second sheet 20 may be disposed such that first layer 20A faces resin 16. First sheet 18 may be disposed such that second layer 18B (e.g., the PTFE membrane) faces resin 16. Alternatively, first sheet 18 may be disposed such that first layer 18A faces resin 16.

Figure 19:
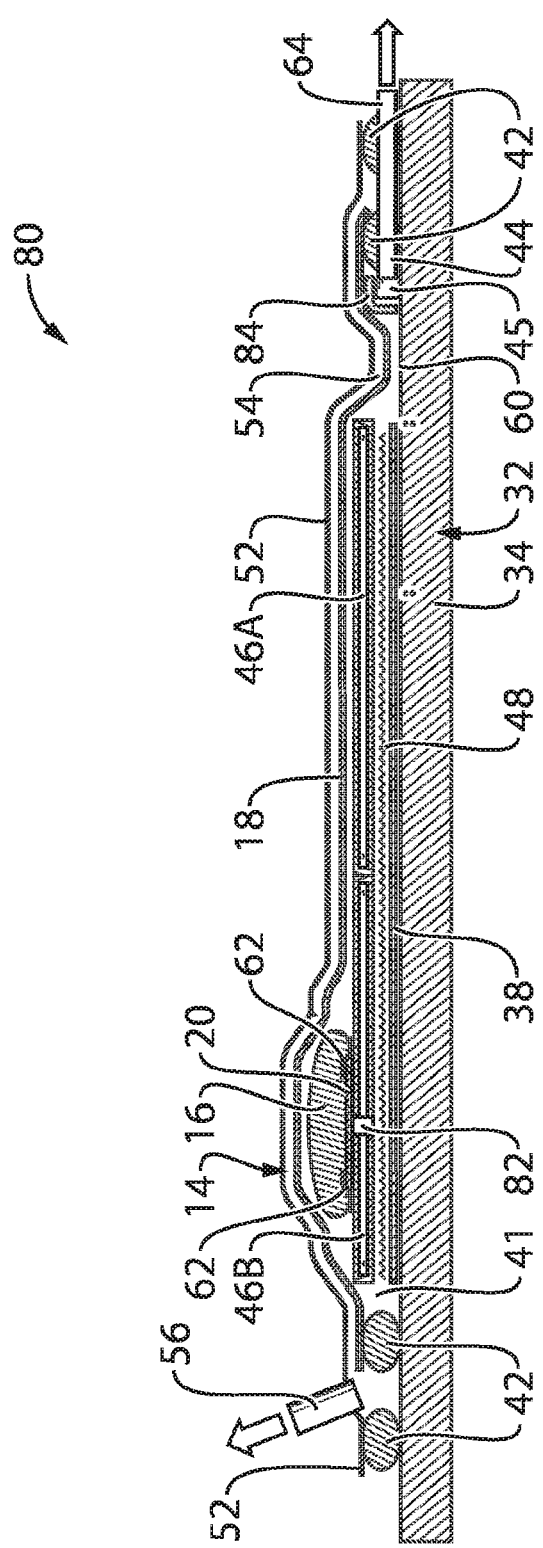
FIG. 19 is a schematic illustration of another exemplary apparatus for infusing resin into a region of a composite part where the resin retained by the resin retaining/releasing device of FIG. 18 is laterally offset from the region.

FIG. 19 is a schematic illustration of another exemplary apparatus 80 for infusing resin 16 into region 32 of part 34 comprising a fibre-reinforced structure by resin infusion. Apparatus 80 of FIG. 19 comprises elements previously illustrated and described above therefore such description will not be repeated. In FIG. 19, infusion region 32 may be integral to part 34. For example, infusion region 32 may comprise an area of dry fibres which was not completely impregnated by resin during manufacturing or a removed damaged area of part 34.

FIG. 19 also shows that the quantity of resin 16 of resin retaining/releasing device 14 may be laterally offset from infusion region 32 of part 34. Accordingly, distribution mesh 48 may extend laterally to form at least part of a resin path between resin retaining/releasing device 14 and infusion region 32. For example, distribution mesh 48 may extend laterally to cover infusion region 32 but also be disposed under resin retaining/releasing device 14 so that resin 16 permeating through second sheet 20 may be directed to infusion region 32 via distribution mesh 48. In some applications, the lateral offset of resin 16 from infusion region 32 may be advantageous in providing a desired surface finish over infusion region 32 as previously explained above. Apparatus 80 may comprise a plurality of heating blankets 46A, 46B for applying heat to different regions. For example, heating blanket 46A may be positioned to apply heat to infusion region 32 and heating blanket 46B may be positioned to apply heat to resin 16. Infusion hole 82 may be disposed in heating blanket 46B.

Figure 20:
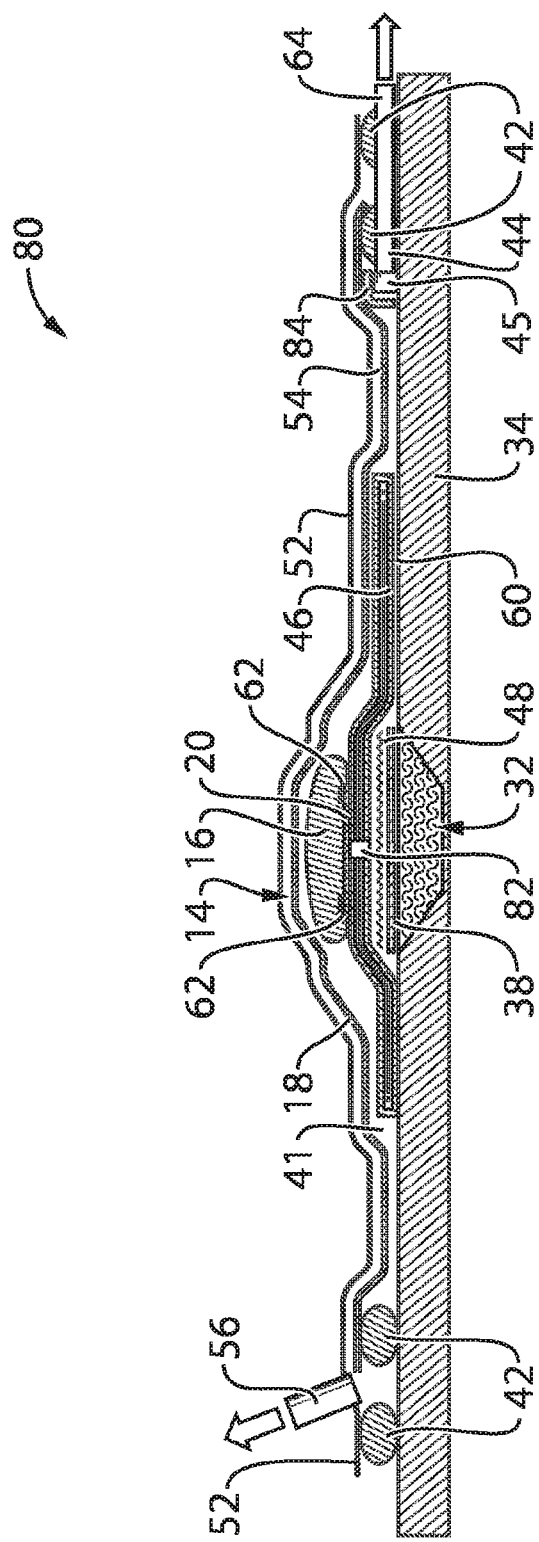
FIG. 20 is a schematic illustration of another exemplary apparatus for infusing resin into a scarfed region containing a constituent of a composite material using the resin retaining/releasing device of FIG. 18.

FIG. 20 is a schematic illustration of another exemplary apparatus 80 for infusing resin 16 into infusion region 32 of composite part 34 using resin retaining/releasing device 14. Apparatus 80 of FIG. 20 comprises elements previously illustrated and described above therefore such description will not be repeated. In FIG. 20, infusion region 32 may be integral to part 34. For example, infusion region 32 may comprise a scarfed region filled with dry fibres or fabric to be infused with resin 16.

Figure 21:
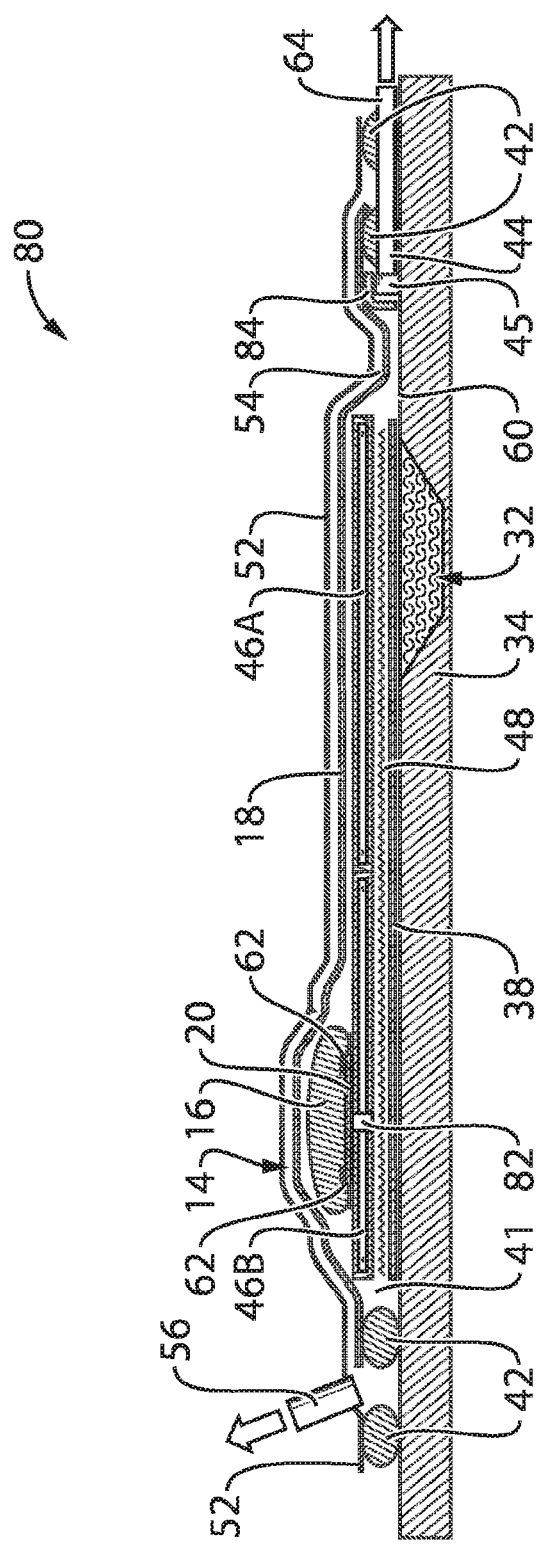
FIG. 21 is a schematic illustration of another exemplary apparatus for infusing resin into a scarfed region containing a constituent of a composite material where the resin retained by the resin retaining/releasing device of FIG. 18 is laterally offset from the scarfed region.

FIG. 21 is a schematic illustration of another exemplary apparatus 80 for infusing resin 16 into infusion region 32 of composite part 34 using resin retaining/releasing device 14. Apparatus 80 of FIG. 21 comprises elements previously illustrated and described above therefore such description will not be repeated. In FIG. 20, infusion region 32 may comprise a scarfed region filled with dry fibres or fabric to be infused with resin 16. FIG. 21 also shows that the quantity of resin 16 of resin retaining/releasing device 14 may be laterally offset from infusion region 32 of part 34 as previously explained above. Apparatus 80 may comprise a plurality of heating blankets 46A, 46B for applying heat to different regions. For example, heating blanket 46A may be positioned to apply heat to infusion region 32 and heating blanket 46B may be positioned to apply heat to resin 16. Infusion hole 82 may be disposed in heating blanket 46B.

Figure 22:
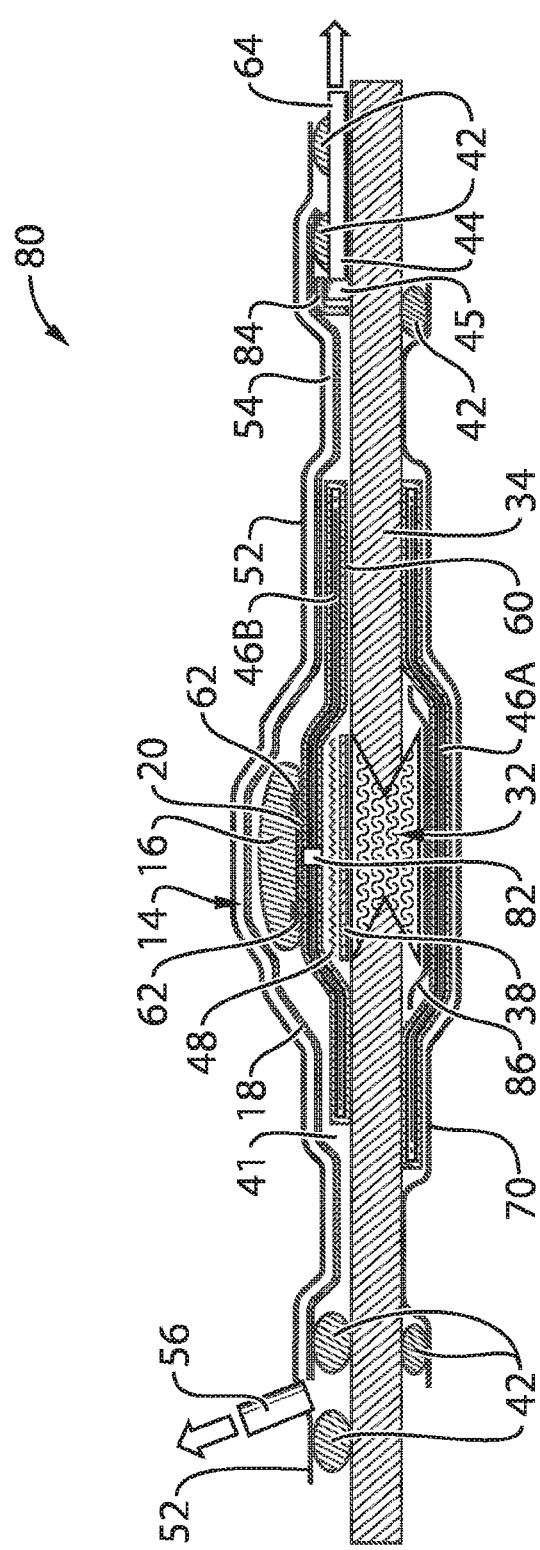
FIG. 22 is a schematic illustration of another exemplary apparatus for infusing resin into a double-sided scarfed region containing a constituent of a composite material using the resin retaining/releasing device of FIG. 18.

FIG. 22 is a schematic illustration of another exemplary apparatus 80 for infusing resin 16 into infusion region 32 of composite part 34 using resin retaining/releasing device 14. Apparatus 80 of FIG. 22 comprises elements previously illustrated and described above therefore such description will not be repeated. In FIG. 22, infusion region 32 may comprise a double-sided scarfed region filled with dry fibres or fabric to be infused with resin 16. For example, infusion region 32 may be at least partially filled with dry carbon fabric plies to be infused with resin 16. Infusion region 32 may comprise a damaged portion of part 34 that has been machined to have a double-sided scarfed configuration prior to resin infusion. One or more first heating blankets 46A may be disposed on one side of infusion region 32 and one or more second heating blankets 46B may be disposed on another (e.g., opposite) side of infusion region 32. The number and locations of heating blankets 46A, 46B may be selected based on the particular heating requirements for resin infusion. The number and locations of heating blankets 46A, 46B may also depend on one or more of the type, shape and size of infusion region 32, of part 34 and/or of resin retaining/releasing device 14. For example, first heating blanket(s) 46A may be disposed in first volume 41 defined at least in part by first vacuum barrier 40 and third vacuum barrier 70, and, second heating blanket 46B may be disposed in first volume 41 between resin retaining/releasing device 14 and infusion region 32.

Figure 23:
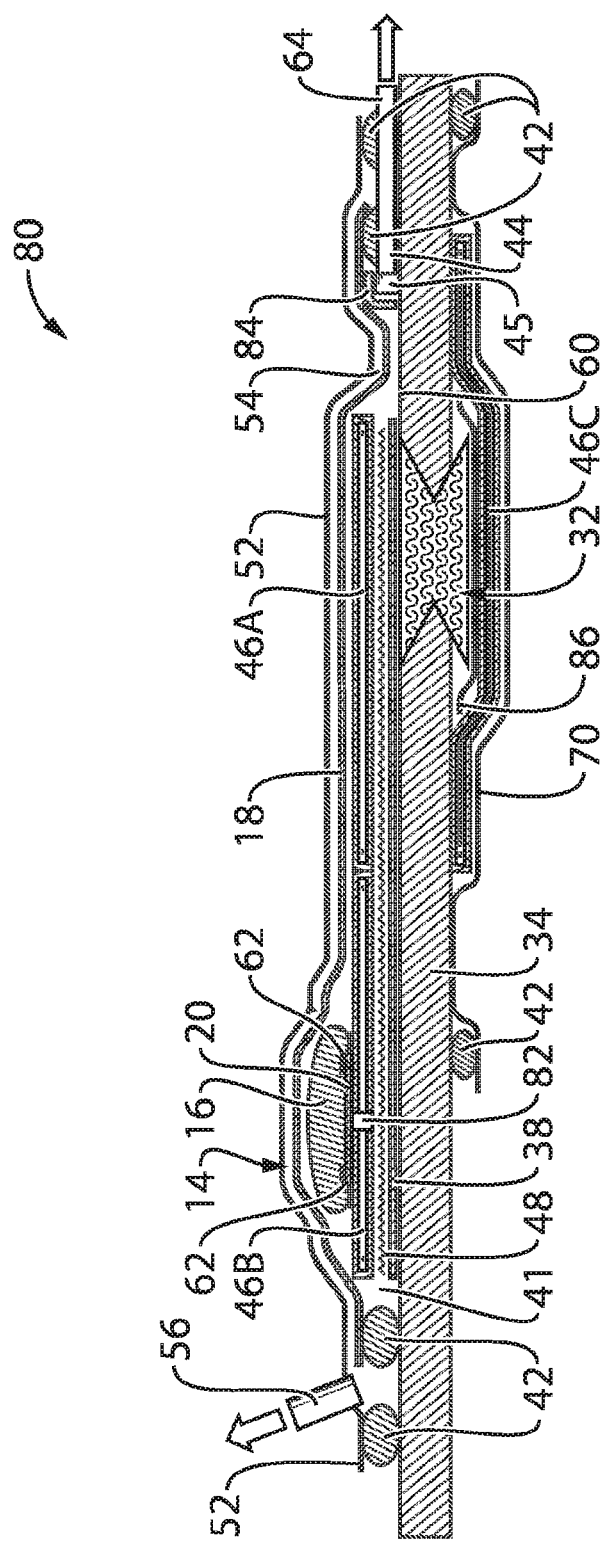
FIG. 23 is a schematic illustration of another exemplary apparatus for infusing resin into a double-sided scarfed region containing a constituent of a composite material where the resin retained by the resin retaining/releasing device of FIG. 18 is laterally offset from the double-sided scarfed region.

FIG. 23 is a schematic illustration of another exemplary apparatus 80 for infusing resin into infusion region 32 of composite part 34 using resin retaining/releasing device 14. Apparatus 80 of FIG. 23 comprises elements previously illustrated and described above therefore such description will not be repeated. In FIG. 23, infusion region 32 may comprise a double-sided scarfed region filled with dry fibres or fabric to be infused with resin 16. The quantity of resin 16 of resin retaining/releasing device 14 may be laterally offset from infusion region 32 of part 34 as previously explained above. Apparatus 80 may comprise a plurality of heating blankets 46A, 46B, 46C for applying heat to different regions. For example, heating blanket 46A may be positioned to apply heat to infusion region 32 and heating blanket 46B may be positioned to apply heat to resin 16. Heating blanket 46C may be disposed on an opposite side of infusion region 32 than that of heating blanket 46A and may be configured to apply heat to infusion region 32. Infusion hole 82 may be disposed in heating blanket 46B. A suitable release film 86 may be disposed between infusion region 32 and heating blanket 46C. Release film 86 may comprise a suitable release agent as described above that is substantially resin-impermeable.

Figure 24:
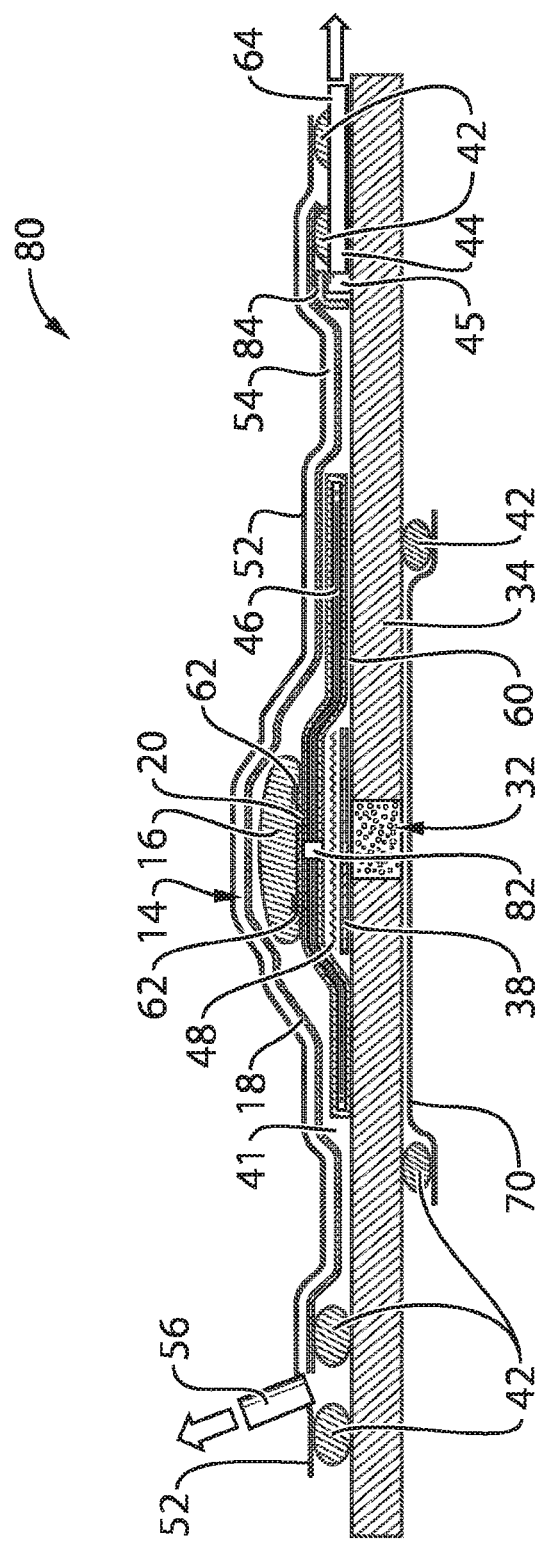
FIG. 24 is a schematic illustration of another exemplary apparatus for infusing resin into a region of a composite part comprising a hole containing a constituent of a composite material using the resin retaining/releasing device of FIG. 18.

FIG. 24 is a schematic illustration of another exemplary apparatus 80 for infusing resin into infusion region 32 of composite part 34 using resin retaining/releasing device 14. Apparatus 80 of FIG. 24 comprises elements previously illustrated and described above therefore such description will not be repeated. In various embodiments disclosed herein, region 32 may comprise one or more holes at least partially filled with one or more constituents of a composite material such as dry and relatively short fibres as described above.

Figure 25:
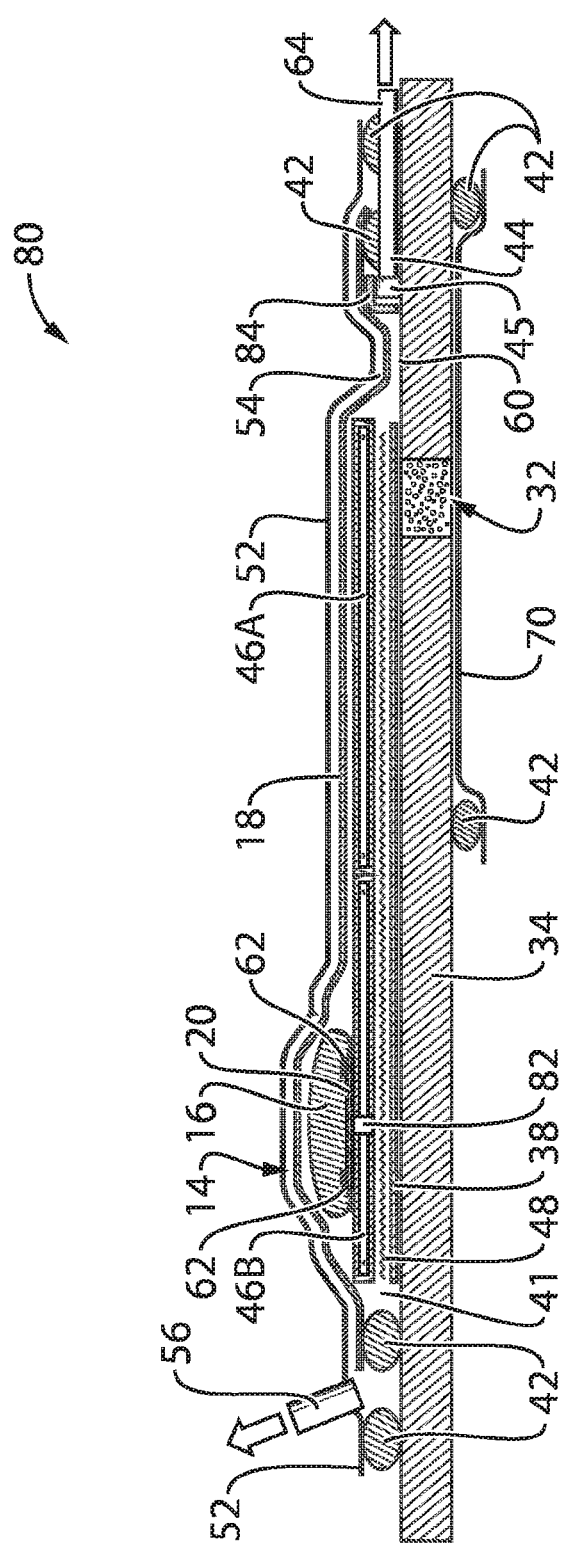
FIG. 25 is a schematic illustration of another exemplary apparatus for infusing resin into a region of a composite part comprising a hole containing a constituent of a composite material where the resin retained by the resin retaining/releasing device of FIG. 18 is laterally offset from the region.

FIG. 25 is a schematic illustration of another exemplary apparatus for infusing resin into infusion region 32 of composite part 34 using resin retaining/releasing device 14. Apparatus 80 of FIG. 25 comprises elements previously illustrated and described above therefore such description will not be repeated. In FIG. 25, infusion region 32 may comprise one or more holes at least partially filled with one or more constituents of a composite material such as dry and relatively short fibres to be infused with resin 16. The quantity of resin 16 of resin retaining/releasing device 14 may be laterally offset from infusion region 32 of part 34 as previously explained above. Apparatus 80 may comprise a plurality of heating blankets 46A, 46B for applying heat to different regions. For example, heating blanket 46A may be positioned to apply heat to infusion region 32 and heating blanket 46B may be positioned to apply heat to resin 16. Infusion hole 82 may be disposed in heating blanket 46B.

Based on the examples of apparatus 30 and 80 disclosed herein, it is understood that in various embodiments, resin infusion into the various types of regions 32 (e.g., dry fibres, scarfed region, double-sided scarfed region and hole filled with short fibres or other composite material constituent) could be achieved whether or not resin retaining/releasing device 14 is laterally offset from infusion region 32. One or more aspects of one embodiment of apparatus 30, 80 could be combined with one or more aspects of another embodiment of apparatus 30, 80.

Depending on the size of infusion region 32 and also whether infusion region extends through part 34, some support may be required on the opposite side of part 34 in addition to third vacuum barrier 70 as shown in FIGS. 13-16, 24 and 25 for example. In some embodiments a relatively rigid support (e.g., plate) and suitable release agent may be disposed between third vacuum barrier 70 and infusion region 32 to provide support for the material in infusion region 32 and also prevent the third vacuum barrier 70 from being drawn in infusion region 32 when a vacuum is applied via vacuum port 44.

Figure 26:
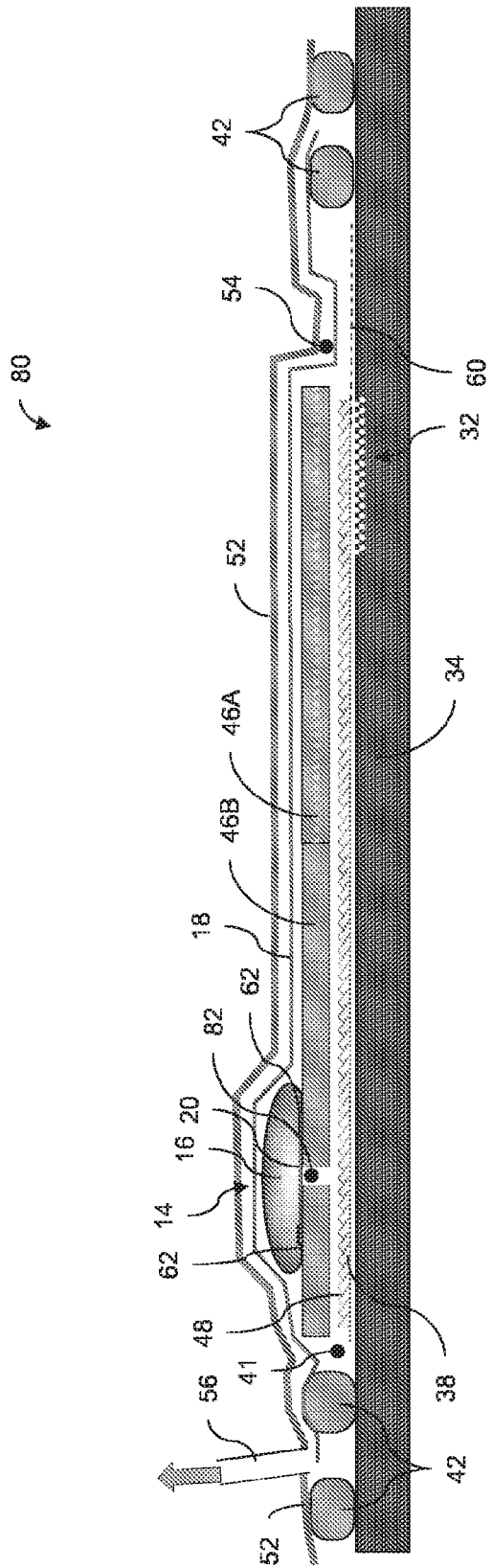
FIG. 26 is a schematic illustration of another exemplary apparatus for infusing resin into a region of a composite part where the apparatus comprises a single vacuum port.

FIG. 26 is a schematic illustration of another exemplary apparatus 80 for infusing resin 16 into infusion region 32 of composite part 34 where apparatus 80 comprises a single vacuum port 56. In the embodiments shown in FIGS. 17 and 19-26 where first sheet 18 is gas-permeable, it may be sufficient in some applications to omit one of vacuum ports 44, 56 so that only one of vacuum ports 44, 56 is used.

Figure 27:
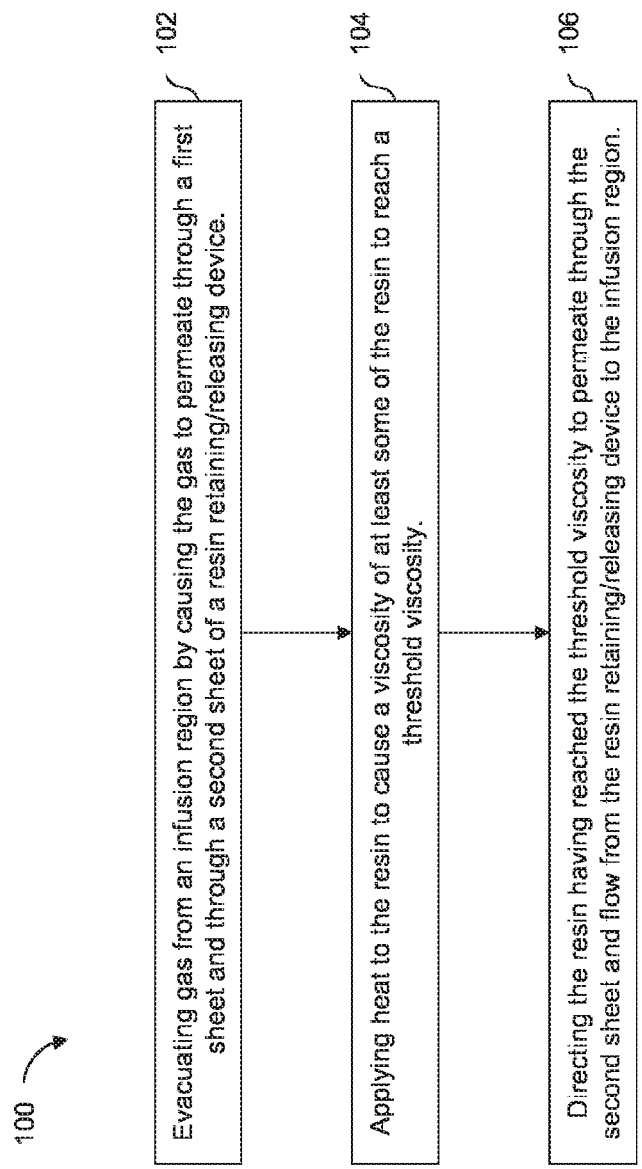
FIG. 27 is a flowchart illustrating a method for manufacturing or repairing fibre-reinforced composite materials.

FIG. 27 is a flowchart of an exemplary method 100 for manufacturing or repairing fibre-reinforced composite materials. Method 100 or part thereof may be performed using resin retaining/releasing device 14. Method 100 of part thereof may be performed using apparatus 30, 80 described above. For example, method 100 may be used for manufacturing or repairing fibre-reinforced composite materials using resin retaining/releasing device 14 where resin retaining/releasing device 14 comprises first sheet 18 and opposite second sheet 20 at least partially enclosing a quantity of resin 16 having a viscosity that is temperature dependent. Method 100 may comprise: evacuating gas from a substantially sealed first volume 41 enclosing infusion region 32 by causing gas to permeate through first sheet 18 and through second sheet 20 of resin retaining/releasing device 14 (see block 102); applying heat (e.g., using heater blanket 46) to resin 16 inside resin retaining/releasing device 14 to cause a viscosity of at least some of resin 16 to reach a threshold viscosity (see block 104); and infusing resin 16 into infusion region 32 of part 34 by directing the resin 16 having reached the threshold viscosity to permeate through second sheet 20 and flow from resin retaining/releasing device 14 to infusion region 32.

The evacuation of the gas may be performed during any portion or during the entirety of method 100. In some embodiments the magnitude of the vacuum inside of first volume 41 may be a residual pressure of about 3 millibars in relation to the atmosphere. The permeation of gas through first sheet 18 may occur substantially across the surface of first sheet 18 including the portion of first sheet 18 that may be in contact with resin 16. Accordingly, the use of first sheet 18 may permit the evacuation of gas from resin 16 directly through first sheet 18. For example, in some embodiments the evacuation of gas may be performed prior to and/or during the infusion of resin 16 into infusion region 32. In some embodiments, the evacuation of gas may be performed after the infusion of resin into the infusion region.

In some embodiments of method 100, the quantity of resin 16 of resin retaining/releasing device 14 may be laterally offset from infusion region 32 of part 34 and method 100 may comprise directing resin 16 toward infusion region 32. Alternatively, the quantity of resin 16 of resin retaining/releasing device 14 may be disposed alongside infusion region 32 so that the resin path between resin 16 and infusion region 32 may be relatively short.

The directing of resin 16 toward infusion region 32 may be achieved by way of distribution mesh 38. The flow of resin 16 from the area of resin retaining/releasing device 14 may be at least partially driven by the difference in pressure between the atmosphere (~1 bar) and the residual pressure of about 3 millibars inside of first volume 41 and also by gravity when resin retaining/releasing device 14 is disposed above infusion region 32. The flow of resin 16 may also be at least partially driven by the application of a force on resin 16. Such application of force may promote resin 16 having reached the threshold viscosity to permeate through second sheet 20 and to flow toward infusion region 32. The application of such force may be achieved by the evacuation of first volume 41 and/or second volume 54 and the collapsing of first vacuum barrier 40 and/or second vacuum barrier 52 onto resin retaining/releasing device 14 (see FIG. 8A) as explained above. For example, method 100 may comprise evacuating gas from second volume 54 defined by barrier 52 substantially sealed to part 34 and enclosing first volume 41.

Method 100 may also comprise applying heat to infusion region 32 of part 34 (e.g., heating blankets 46A, 46B in FIGS. 15 and 23). In some embodiments, the heat may be applies from a first side of part 34 and from an opposite second side of the part 34. In some embodiments (e.g., see FIGS. 17 and 19-25), method 100 may comprise directing resin 16 having reached the threshold viscosity to permeate through hole 82 in heater blanket 46B and flow from the resin retaining/releasing device 14 to infusion region 32.

Method 100 may comprise using resin 16 as described herein and which may comprise a one-part liquid epoxy. In some embodiments, threshold viscosity at which resin 16 may begin to permeate second sheet 20 may be about 50 centipoise.

Method 100 may be used for infusing resin 16 into infusion regions 32 of various types. For example, as explained above, infusion region 32 may comprise one or more of dry fabric, a scarfed region, a hole with dry fibres therein, dry fabric plies and a double-sided scarfed region.

The use of resin retaining/releasing device 14 in the apparatus 30, 80 and methods 100 disclosed herein may reduce the risk of obtaining porosity due to trapped gas (e.g., air) in fibre-reinforced composite materials manufactured or repaired according to the present disclosure.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems, devices and assemblies disclosed and shown herein may comprise a specific number of elements/components, the systems, devices and assemblies could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The invention claimed is:

1. A device for retaining and controlling a release of resin during a resin infusion process for manufacturing or repairing fibre-reinforced composite materials, comprising:
   a quantity of the resin having a viscosity that is temperature dependent; and
   a first sheet and an opposite second sheet at least partially enclosing the quantity of the resin, the first sheet and the second sheet being gas-permeable, the second sheet being substantially resin-impermeable when the viscosity of the resin is above a threshold viscosity and resin-permeable when the viscosity of the resin is below the threshold viscosity,
   wherein at least one of the first sheet and the second sheet comprises a first layer including a woven fabric and a second layer comprising a porous membrane,
   wherein the device forms at least one of a packet and pouch structure retaining the resin,
   wherein the first sheet comprises a plurality of pores sized to permit passage of gas through the first sheet, and
   wherein the second sheet comprises a plurality of pores sized to permit passage of gas through the second sheet and to permit the passage of the resin through the second sheet when the viscosity of the resin is below the threshold viscosity.

2. The device as defined in claim 1, wherein the first sheet is substantially resin-impermeable when the viscosity of the resin is below the threshold viscosity.

3. The device as defined in claim 1, wherein the porous membrane is a porous polytetrafluoroethylene (PTFE) membrane.

4. The device as defined in claim 3, wherein the porous PTFE membrane of the first layer faces the resin.

5. The device as defined in claim 1, wherein the first sheet and the second sheet are at least partially sealed to each other.

6. The device as defined in claim 1, wherein the first sheet is resin-permeable when the viscosity of the resin is below the threshold viscosity.

7. The device as defined in claim 1, wherein the resin comprises a one-part liquid epoxy.

8. The device as defined in claim 1, wherein the threshold viscosity is about 50 mPa·s.

9. An apparatus for manufacturing or repairing fibre-reinforced composite materials, comprising:
   a vacuum barrier for covering an infusion region comprising a constituent of a composite material and to define a substantially sealed volume comprising the infusion region;
   a vacuum port for fluid communication with the volume;
   a device for retaining and controlling a release of resin, the device being disposed inside the volume and comprising:
   a quantity of the resin having a viscosity that is temperature dependent; and a first sheet and an opposite second sheet at least partially enclosing the quantity of the resin, the first sheet and the second sheet being gas-permeable, the second sheet being substantially resin-impermeable when the viscosity of the resin is above a threshold viscosity and resin-permeable when the viscosity of the resin is below the threshold viscosity, the second sheet forming at least part of an infusion path between the resin and the infusion region, wherein at least one of the first sheet and the second sheet comprises a first layer including a woven fabric and a second layer comprising a porous membrane, wherein the device forms at least one of a packet structure or a pouch structure retaining the resin, wherein the first sheet comprises a plurality of pores sized to permit passage of gas through the first sheet, and wherein the second sheet comprises a plurality of pores sized to permit passage of gas through the second sheet and to permit the passage of the resin through the second sheet when the viscosity of the resin is below the threshold viscosity; and a heater for heating the resin.

10. The apparatus as defined in claim 9, wherein the quantity of the resin is laterally offset from the infusion region.

11. The apparatus as defined in claim 10, wherein the vacuum port is laterally offset from the infusion region in a lateral direction opposite that of the quantity of the resin from the infusion region.

12. The apparatus as defined in claim 9, wherein the quantity of the resin is disposed alongside the infusion region.

13. The apparatus as defined in claim 9, further comprising a resin distribution mesh forming part of the infusion path between the resin and the infusion region.

14. The apparatus as defined in claim 13, further comprising a release medium disposed between the device and the distribution mesh.

15. The apparatus as defined in claim 9, comprising a release medium disposed between the device and the infusion region.

16. The apparatus as defined in claim 9, wherein the heater comprises a heating blanket covering at least part of the device and at least part of the infusion region.

17. The apparatus as defined in claim 9, wherein the heater comprises a heating blanket extended between the device and the infusion region.

18. The apparatus as defined in claim 17, wherein the heating blanket comprises an infusion hole therethrough forming at least part of the infusion path.

* * * * *